(12) United States Patent
Manuilov et al.

(10) Patent No.: US 11,926,782 B2
(45) Date of Patent: Mar. 12, 2024

(54) MAGNETIZABLE ABRASIVE PARTICLE AND METHOD OF MAKING THE SAME

(71) Applicant: 3M INNOVATIVE PROPERTIES COMPANY, St. Paul, MN (US)

(72) Inventors: Sergei A. Manuilov, Bayport, MN (US); Adam D. Milller, Vadnais Heights, MN (US); Laura M. Lara Rodriguez, Woodbury, MN (US); Dwight D. Erickson, Woodbury, MN (US); Anatoly Z. Rosenflanz, Maplewood, MN (US)

(73) Assignee: 3M Innovative Property Company, St. Paul, MN (US)

( * ) Notice: Subject to any disclaimer, the term of this patent is extended or adjusted under 35 U.S.C. 154(b) by 0 days.

(21) Appl. No.: 17/754,654

(22) PCT Filed: Oct. 12, 2020

(86) PCT No.: PCT/IB2020/059552
§ 371 (c)(1),
(2) Date: Apr. 8, 2022

(87) PCT Pub. No.: WO2021/074768
PCT Pub. Date: Apr. 22, 2021

(65) Prior Publication Data
US 2023/0193101 A1 Jun. 22, 2023

Related U.S. Application Data

(60) Provisional application No. 62/914,778, filed on Oct. 14, 2019.

(51) Int. Cl.
*C09K 3/14* (2006.01)
*H01F 1/11* (2006.01)

(52) U.S. Cl.
CPC .............. *C09K 3/1436* (2013.01); *H01F 1/11* (2013.01)

(58) Field of Classification Search
None
See application file for complete search history.

(56) References Cited

U.S. PATENT DOCUMENTS

| 1,930,788 A | 10/1933 | Buckner |
| 2,370,636 A | 3/1945 | Paul |
| 2,857,879 A | 10/1958 | Johnson |
| 2,958,593 A | 11/1960 | Hoover |

(Continued)

FOREIGN PATENT DOCUMENTS

| CN | 102153333 | * 11/2014 |
| CN | 104860669 | * 8/2015 |

(Continued)

OTHER PUBLICATIONS

International Search Report for PCT International Application No. PCT/IB2020/059552, dated Dec. 22, 2020, 4 pages.

*Primary Examiner* — Mandy C Louie
(74) *Attorney, Agent, or Firm* — Katherine M. Scholz

(57) ABSTRACT

A magnetizable abrasive particle is presented. The magnetizable abrasive particle has a ceramic particle having an outer surface. The magnetizable abrasive particle also has a magnetic coating layer applied to the outer surface of the ceramic particle prior to sintering. The sintered magnetizable particle is responsive to a magnetic field.

17 Claims, 13 Drawing Sheets

(56) References Cited

U.S. PATENT DOCUMENTS

| | | |
|---|---|---|
| 3,625,666 A | 12/1971 | James |
| 4,008,055 A | 2/1977 | Phaal |
| 4,018,575 A | 4/1977 | Davis |
| 4,227,350 A | 10/1980 | Fitzer |
| 4,314,827 A | 2/1982 | Leitheiser |
| 4,331,453 A | 5/1982 | Dau |
| 4,609,380 A | 9/1986 | Barnett |
| 4,623,364 A | 11/1986 | Cottringer |
| 4,652,275 A | 3/1987 | Bloecher |
| 4,734,104 A | 3/1988 | Broberg |
| 4,744,802 A | 5/1988 | Schwabel |
| 4,751,138 A | 6/1988 | Tumey |
| 4,770,671 A | 9/1988 | Monroe |
| 4,881,951 A | 11/1989 | Monroe |
| 4,991,362 A | 2/1991 | Heyer |
| 5,137,542 A | 8/1992 | Buchanan |
| 5,152,917 A | 10/1992 | Pieper |
| 5,181,939 A | 1/1993 | Neff |
| 5,201,916 A | 4/1993 | Berg |
| 5,213,591 A | 5/1993 | Celikkaya |
| 5,366,523 A | 11/1994 | Rowenhorst |
| 5,417,726 A | 5/1995 | Stout |
| 5,435,816 A | 7/1995 | Spurgeon |
| 5,554,068 A | 9/1996 | Carr |
| 5,573,619 A | 11/1996 | Benedict |
| 5,591,239 A | 1/1997 | Larson |
| RE35,570 E | 7/1997 | Rowenhorst |
| 5,672,097 A | 9/1997 | Hoopman |
| 5,681,361 A | 10/1997 | Sanders |
| 5,712,210 A | 1/1998 | Windisch |
| 5,858,140 A | 1/1999 | Berger |
| 5,928,070 A | 7/1999 | Lux |
| 5,942,015 A | 8/1999 | Culler |
| 5,946,991 A | 9/1999 | Hoopman |
| 5,975,987 A | 11/1999 | Hoopman |
| 5,984,988 A | 11/1999 | Berg |
| 6,017,831 A | 1/2000 | Beardsley |
| 6,129,540 A | 10/2000 | Hoopman |
| 6,207,246 B1 | 3/2001 | Moren |
| 6,261,682 B1 | 7/2001 | Law |
| 6,302,930 B1 | 10/2001 | Lux |
| 8,034,137 B2 | 10/2011 | Erickson |
| 8,142,531 B2 | 3/2012 | Adefris |
| 8,142,532 B2 | 3/2012 | Erickson |
| 8,142,891 B2 | 3/2012 | Culler |
| 8,262,758 B2 | 9/2012 | Gao |
| 8,764,865 B2 | 7/2014 | Boden |
| 2008/0289262 A1 | 11/2008 | Gao |
| 2009/0165394 A1 | 7/2009 | Culler |
| 2009/0169816 A1 | 7/2009 | Erickson |
| 2010/0146867 A1 | 6/2010 | Boden |
| 2012/0227333 A1 | 9/2012 | Adefris |
| 2013/0040537 A1 | 2/2013 | Schwabel |
| 2013/0125477 A1 | 5/2013 | Adefris |
| 2013/0344786 A1 | 12/2013 | Keipert |
| 2019/0249053 A1 | 8/2019 | Nelson |
| 2019/0264081 A1* | 8/2019 | Nienaber .......... C04B 35/62892 |
| 2019/0270921 A1 | 9/2019 | Martinez |

FOREIGN PATENT DOCUMENTS

| | | |
|---|---|---|
| EP | 0833803 | 4/1998 |
| GB | 396231 | 8/1933 |
| GB | 1477767 | 6/1977 |
| WO | WO 2018-080703 | 5/2018 |
| WO | WO 2018-080755 | 5/2018 |
| WO | WO 2018-081044 | 5/2018 |

* cited by examiner

100μm

100μm

MAGNETIZABLE ABRASIVE PARTICLE AND METHOD OF MAKING THE SAME

CROSS REFERENCE TO RELATED APPLICATIONS

This application is a national stage filing under 35 U.S.C. 371 of PCT/IB2020/059552, filed Oct. 12, 2020, which claims the benefit of U.S. Provisional Application No. 62/914,778, filed Oct. 14, 2019, the disclosure of which is incorporated by reference in its/their entirety herein.

BACKGROUND

Various types of abrasive articles are known in the art. For example, coated abrasive articles generally have abrasive particles adhered to a backing by a resinous binder material. Examples include sandpaper and structured abrasives having precisely shaped abrasive composites adhered to a backing. The abrasive composites generally include abrasive particles and a resinous binder.

Bonded abrasive articles include abrasive particles retained in a binder matrix that can be resinous or vitreous. This mixture of binder and abrasive is typically shaped into blocks, sticks, or wheels. Examples include, grindstones, cutoff wheels, hones, and whetstones.

Precise placement and orientation of abrasive particles in abrasive articles such as, for example, coated abrasive articles and bonded abrasive articles has been a source of continuous interest for many years.

For example, coated abrasive articles have been made using techniques such as electrostatic coating of abrasive particles to align crushed abrasive particles with the longitudinal axes perpendicular to the backing. Likewise, shaped abrasive particles have been aligned by mechanical methods as disclosed in U. S. Pat. Appl. Publ. No. 2013/0344786 A1 (Keipert). Additionally, U.S. Pat. No. 1,930,788 (Buckner) describes the use of magnetic flux to orient abrasive grain having a thin coating of iron dust in bonded abrasive articles.

There is a continuing need for new materials and methods for bonding magnetic materials to abrasive particles.

SUMMARY

The present disclosure provides a magnetizable abrasive particle. The magnetizable abrasive particle has a ceramic particle having an outer surface. The magnetizable abrasive particle also has a magnetic coating layer applied to the outer surface of the ceramic particle prior to sintering. The sintered magnetizable particle is responsive to a magnetic field.

The above Summary is not intended to describe each illustrated embodiment or every implementation of the present disclosure. Further features and advantages are disclosed in the embodiments that follow. The Drawings and the Detailed Description that follow more particularly exemplify certain embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which:

FIG. 1A is a schematic cross-sectional view of a magnetizable shaped abrasive particle taken along line 1A-1A.

FIG. 1B is a schematic cross-sectional view of magnetizable shaped abrasive particle 280 removed from mold 286.

Figure 1:
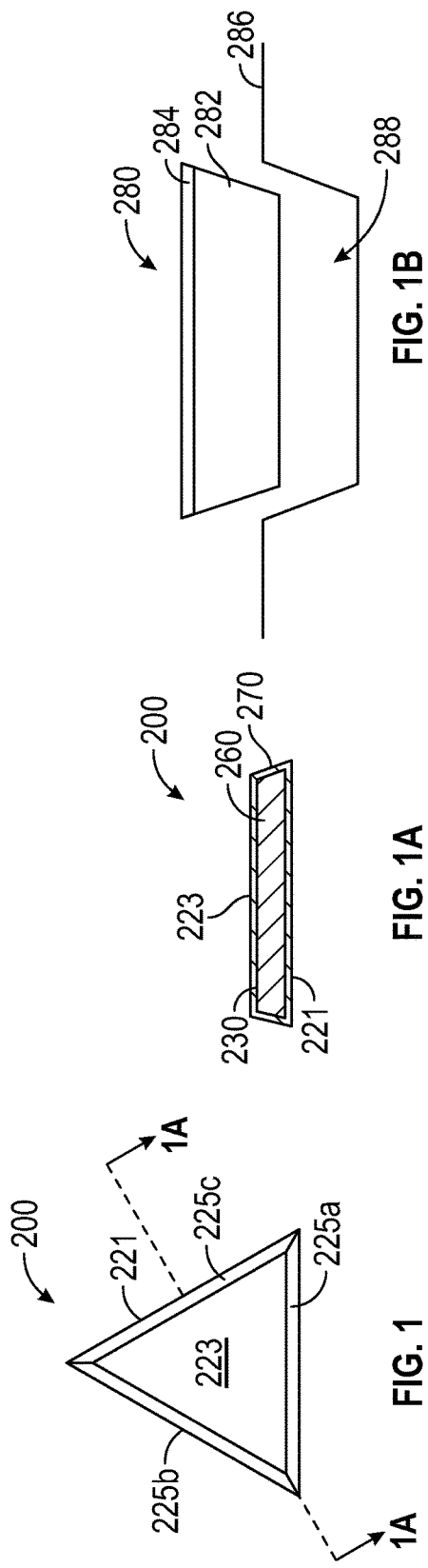
FIG. 1 is a schematic top view of an exemplary magnetizable shaped abrasive particle according to the present disclosure.

While the above-identified drawings, which may not be drawn to scale, set forth various embodiments of the present disclosure, other embodiments are also contemplated, as noted in the Detailed Description. In all cases, this disclosure describes the presently disclosed invention by way of representation of exemplary embodiments and not by express limitations. It is understood that numerous other modifications and embodiments can be devised by those skilled in the art, which fall within the scope and spirit of this disclosure.

DETAILED DESCRIPTION

For the following defined terms, these definitions shall be applied for the entire Specification, including the claims, unless a different definition is provided in the claims or elsewhere in the Specification based upon a specific reference to a modification of a term used in the following definitions:

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

The term "ceramic" refers to any of various hard, brittle, heat- and corrosion-resistant materials made of at least one metallic element (which may include silicon) combined with oxygen, carbon, nitrogen, or sulfur. Ceramics may be crystalline or polycrystalline, for example.

The term "ferrimagnetic" refers to materials that exhibit ferrimagnetism. Ferrimagnetism is a type of permanent magnetism that occurs in solids in which the magnetic fields associated with individual atoms spontaneously align themselves, some parallel, or in the same direction (as in ferromagnetism), and others generally antiparallel, or paired off in opposite directions (as in antiferromagnetism). The magnetic behavior of single crystals of ferrimagnetic materials may be attributed to the parallel alignment; the diluting effect of those atoms in the antiparallel arrangement keeps the magnetic strength of these materials generally less than that of purely ferromagnetic solids such as metallic iron. Ferrimagnetism occurs chiefly in magnetic oxides known as ferrites. The spontaneous alignment that produces ferrimagnetism is entirely disrupted above a temperature called the Curie point, characteristic of each ferrimagnetic material. When the temperature of the material is brought below the Curie point, ferrimagnetism revives.

The term "ferromagnetic" refers to materials that exhibit ferromagnetism. Ferromagnetism is a physical phenomenon in which certain electrically uncharged materials strongly attract others. In contrast to other substances, ferromagnetic materials are magnetized easily, and in strong magnetic fields the magnetization approaches a definite limit called saturation. When a field is applied and then removed, the magnetization does not return to its original value. This phenomenon is referred to as hysteresis. When heated to a certain temperature called the Curie point, which is generally different for each substance, ferromagnetic materials lose their characteristic properties and cease to be magnetic; however, they become ferromagnetic again on cooling.

The terms "magnetic" and "magnetized" mean being ferromagnetic or ferrimagnetic at 20° C., or capable of being made so, unless otherwise specified. Preferably, magnetizable layers according to the present disclosure either have, or can be made to have by exposure to an applied magnetic field.

The term "magnetic field" refers to magnetic fields that are not generated by any astronomical body or bodies (e.g., Earth or the sun). In general, magnetic fields used in practice of the present disclosure have a field strength in the region of the magnetizable abrasive particles being oriented of at least about 10 gauss (1 mT), preferably at least about 100 gauss (10 mT), and more preferably at least about 1000 gauss (0.1 T).

The term "magnetizable" means capable of being magnetized or already in a magnetized state.

The term "shaped abrasive particle" refers to a ceramic abrasive particle that has been intentionally shaped (e.g., extruded, die cut, molded, screen-printed) at some point during its preparation such that the resulting ceramic body is non-randomly shaped. The term "shaped abrasive particle" as used herein excludes ceramic bodies obtained by a mechanical crushing or milling operation. In some embodiments, "shaped abrasive particle" refers to an abrasive particle wherein at least a portion of the abrasive particle has a predetermined shape that is replicated from a mold cavity used to form a precursor shaped abrasive particle that is sintered to form the precisely-shaped abrasive particle. A shaped abrasive particle will generally have a predetermined geometric shape that substantially replicates the mold cavity that was used to form the abrasive particle.

The term "platey crushed abrasive particle", which refers to a crushed abrasive particle resembling a platelet and/or flake that is characterized by a thickness that is less than the width and length. For example, the thickness may be less than ½, ⅓, ¼, ⅕, ⅙, ⅐, ⅛, ⅑, or even less than 1/10 of the length and/or width. Likewise, the width may be less than ½, ⅓, ¼, ⅕, ⅙, ⅐, ⅛, ⅑, or even less than 1/10 of the length.

The term "essentially free of" means containing less than 5 percent by weight (e.g., less than 4, 3, 2, 1, 0.1, or even less than 0.01 percent by weight, or even completely free) of, based on the total weight of the object being referred to.

The term "length" refers to the longest dimension of an object.

The term "width" refers to the longest dimension of an object that is perpendicular to its length.

The term "thickness" refers to the longest dimension of an object that is perpendicular to both of its length and width.

The term "aspect ratio" is defined as the ratio of the long axis of the particle through the center of mass of the particle to the short axis of the particle through the center of mass of the particle.

The suffix "(s)" indicates that the modified word can be singular or plural.

The term "magnetic saturation" is the maximum induced magnetic moment that can be obtained in a magnetic field.

The term "magnetic remanence" is the magnetization that persist within a material upon reducing an external magnetic field to zero.

The term "coercivity" is the external magnetic field strength in which the induced magnetization of a material is zero.

The term "monodisperse" describes a size distribution in which all the particles are approximately the same size.

The terms "a", "an", and "the" include plural referents unless the content clearly dictates otherwise. Thus, for example, reference to a material containing "a compound" includes a mixture of two or more compounds.

Before any embodiments of the present disclosure are explained in detail, it is understood that the invention is not limited in its application to the details of use, construction, and the arrangement of components set forth in the following description. The invention is capable of other embodiments and of being practiced or of being carried out in various ways that will become apparent to a person of ordinary skill in the art upon reading the present disclosure. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. It is understood that other embodiments may be utilized and structural or logical changes may be made without departing from the scope of the present disclosure.

As used in this Specification, the recitation of numerical ranges by endpoints includes all numbers subsumed within that range (e.g., 1 to 5 includes 1, 1.5, 2, 2.75, 3, 3.8, 4, and 5, and the like).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Presently described are magnetizable abrasive particles, methods of making such particles, and abrasive articles comprising magnetizable abrasive particles. The ability to magnetize abrasive particles is helpful in creating abrasive articles with high efficiency abrading potential. For example, some abrasive grain is purposely formed to have one or more sharp edges or tips that have a higher abrading efficiency when interacting with a workpiece in a specific orientation. However, ensuring that abrasive particles adhere to an abrasive article in the desired orientation is a difficult mechanical challenge, particularly with smaller abrasive particles.

One solution that has been attempted previously is to coat the abrasive articles with a magnetically responsive coating, and then use a magnetic field to cause the particles to orient themselves during the abrasive article manufacturing process. For example, nickel, cobalt and iron have known magnetic properties.

The process for forming abrasive particles, however, requires a firing process where the particles are sintered in air at about 1400° C. However, in other embodiments, sintering can occur at as low a temperature as 1250° C., or as high as 1500° C., or at any temperature in that range. These high temperatures cause most magnetic materials to oxidize to a state without magnetic properties. For example, magnetite, $Fe_3O_4$, decomposes to nonmagnetic $\alpha$-$Fe_2O_3$. Previous attempts to use magnetic coatings have required, therefore, a separate step to apply a magnetic coating to abrasive particles after firing. However, separately coating the fired abrasive particles has the potential to create agglomerated particles, which may not be desired in all applications. Additionally, getting an even coating on the particles can also be difficult.

It is desired to reduce the number of manufacturing steps to produce magnetically responsive particles. Additionally, it is preferred that the amount of coating per particle be reduced, as the coating is not useful after the coated particle is oriented. For example, the thickness of the coating, in one embodiment, is less than the thickness of the abrasive particle. However, coating thickness may depend on application and the strength of a magnetic field being applied. For example, a 50 nm coating is sufficient to orient some abrasive particles in air at a field strength of about 1000 Oe. However, even less coating may be necessary.

It is desired that the ferrite coating be responsive to a magnetic field, have low coercivity and high permeability. Additionally, it is desired to have a coating that can survive the firing process. This can allow for the manufacture of sintered, dense ceramic particles with a highly responsive magnetic coating. In some embodiments, it may be possible to apply the coating before removing the abrasive particle precursors from a mold.

While the embodiments discussed herein focus on the area of abrasive particle formation, specifically the formation of magnetically responsive shaped abrasive particles, it is to be understood that other embodiments are also possible. For example, formed abrasive particles and/or crushed abrasive particles could also be coated using similar methods to those discussed herein.

While some embodiments described herein describe co-sintering abrasive precursor material with coating material, other embodiments are expressly contemplated. For example, the abrasive particle may be subject to a pre-firing drying step to remove excess solvent prior to a coating being applied. Additionally, the coating may be applied to a fully dense, previously sintered particle. The coated sintered particle can then be re-fired to sinter the coating. Benefits of the sintering process with respect to the coating are described below.

A soft magnetic material is desired for the coating process. The magnetic material should not have a permanent dipole, but when an external magnetic field is applied it should induce a significant magnetic response. The material should have low coercivity. Additionally, a coating method is needed that can reduce agglomeration of particles such that individual particles receive a continuous coating and can be placed in a desired orientation within an abrasive article. In some embodiments described herein, a ferrite coating is used.

Ferrite can be defined based on magnetite ($FeO \cdot Fe_2O_3$) as $XO \cdot M_m Fe_{2-m} O_3$ (m<1) where X can be chosen from one or more of the divalent cations of the following elements: magnesium (Mg), manganese (Mn), zinc (Zn), copper (Cu), nickel (Ni), cobalt (Co), Iron (Fe), or cadmium (Cd). More generically, X is a divalent cation of a transition metal with an atomic radius of 0.7-1.03 pm. X is present in a ratio such that they charge balance one oxygen. M can be chosen from the trivalent cations of aluminum (Al), scandium (Sc), chromium (Cr), manganese (Mn), or iron (Fe). More generically, M is a trivalent cation of a metal with an atomic radius of 0.57-0.83 pm.

Ferrite can also be defined based on yttrium iron garnet ($Y_3Fe_5O_{12}$), where iron (Fe) can be substituted for one or more of the following elements gallium (Ga), germanium (Ge), aluminum (Al), silicon (Si), vanadium (V), scandium (Sc), indium (In), titanium (Ti), zirconium (Zr), tin (Sn), iridium (Ir), antimony (Sb) such that they have the proper ratio and charge to balance the oxygen and yttrium can be substituted for one or more of the following bismuth (Bi), calcium (Ca), galadolinium (Gd), neodymium (Nd), samarium (Sm), praseodymium (Pr), lead (Pb), lanthanum (La), holmium (Ho), erbium (Er), ytterbium (Yb), lutetium (Lu) such that they have the proper ratio and charge to balance the oxygen.

A ferrite coating has improved properties over other approaches for coating a single side of a particle. For instance, the ferrite used in embodiments described herein has improved magnetic properties (higher Ms/Hc ratio) versus other magnetic ceramic materials such as magnetite. A ferrite coating also maintains its magnetic properties after sintering at high temperatures which would result in oxidation of the magnetite and loss of its magnetic properties. One reason for this is the relative stabilities of the oxidation states of certain metals versus iron. For instance, the most common oxidation state of both Ni and Zn is the +2 state, which is present in the ferrite structures described herein. Higher oxidation states are either unknown or difficult to isolate.

In one embodiment of the present invention, the tooling, or mold used to form shaped abrasive particle precursors is used to apply a single-sided coating on each abrasive particle precursor. Achieving a single-sided coating using methods described herein is advantageous over other techniques such as electroless plating or particulate coatings.

FIG. 1 is a schematic top view of an exemplary magnetizable shaped abrasive particle according to the present disclosure. Exemplary magnetizable abrasive particle 200 comprises truncated triangular ceramic particle 260 having ferrite coating 270 disposed on its outer surface 230. Ferrite coating 270 has opposed major surfaces 221, 223 connected to each other by sidewalls 225a, 225b, 225c. FIG. 1A is a schematic cross-sectional view of a magnetizable shaped abrasive particle taken along line 1A-1A, illustrating that, in one embodiment, particle 200 has a continuous coating on its outer surface.

However, while FIG. 1A illustrates an abrasive particle with magnetic coating on all sides, in some embodiments, only one surface of a particle is coated, for example, as illustrated in FIG. 1B. As illustrated in FIG. 1B, it may be possible to apply a magnetic coating while an abrasive particle is within a mold. However, in other embodiments the magnetic coating is applied outside of a mold, for example by spray coating, drop coating, or other suitable coating techniques.

FIG. 1B is a schematic cross-sectional view of magnetizable shaped abrasive particle 280 removed from mold 286. Shaped abrasive particle precursor 280 may be formed within a cavity 288 of a mold 286, for example, from either a slurry or a sol-gel precursor material. Once precursor material 282 has initially set, for example through an initial drying process, magnetic material 284 can be added to cavity 288, for example filling a gap left by precursor material 282, either left intentionally or created through shrinkage.

While FIG. 1B illustrates a particle 280 with a distinct coating layer 284 applied to a mold cavity 288 after abrasive precursor material, other embodiments are expressly contemplated. For example, coating layer 284 may be applied to cavity 288 prior to filling with particle precursor. Additionally, coating layer 284 may be applied before an initial drying process, such that a transition zone is present between a particle portion 282 and coating 284.

Because coated shaped abrasive particle precursor 280 will undergo a later firing step, it is important that precursor layer 282 and coating 284 experience densification-induced shrinkage at approximately similar temperatures in order to prevent premature cracking or fracturing of the abrasive particle. Dilatometry analysis (DIL) to characterize shrinkage was conducted using the following method. DIL runs were made (using an instrument such as that obtained from Netzsch Instruments, Selb, Germany under the trade designation "NETZSCH DIL 502C") using a particle with approximate dimensions of 2 mm×2 mm×2 mm cube. A sample is placed between $Al_2O_3$ rod and support. Each sample is heated in static air at a rate of 10° C./minute from room temperature (about 25° C.) to 1400° C.

It was observed that the coating layer and the precursor layer undergo initial shrinkage at around 1000° C. Subsequent increase in temperature results in acceleration of the shrinkage in both layers indicating simultaneous decrease in dimensions and a decreased probability of cracking. Relative shrinkage of layers is described in Table 1 below.

TABLE 1

| Temperature, C. | Base layer Shrinkage, % of total shrinkage | Top layer Shrinkage, % of total shrinkage |
| --- | --- | --- |
| 1000 | 0.2 | 0.3 |
| 1100 | 30.1 | 19.2 |
| 1200 | 77.6 | 44.6 |
| 1300 | 93.7 | 79.2 |
| 1400 | 100 | 100 |

In one embodiment, after sintering, the particles have a ferrite layer with a theoretical density greater than about 80% of the bulk density, where theoretical density is an estimation of the porosity of a material after a sintering process. The ferrite layer, in another embodiment, may have a theoretical density greater than about 85% of the bulk density.

Ceramic particles illustrated in FIGS. 1, 1A and 1B can be particles of any abrasive material. Useful ceramic materials include, for example, fused aluminum oxide, heat treated aluminum oxide, white fused aluminum oxide, ceramic aluminum oxide materials such as those commercially available as 3M CERAMIC ABRASIVE GRAIN from 3M Company of St. Paul, Minnesota, alpha-alumina, zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, diamond, cubic boron nitride, sol-gel derived ceramics (e.g., alumina ceramics doped with an additive), silica (e.g., quartz, glass beads, glass bubbles and glass fibers) and the like, or a combination thereof. Examples of sol-gel derived crushed ceramic particles can be found in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). A modifying additive can function to enhance some desirable property of the abrasive or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hafnium, chromium, calcium, strontium, yttrium, praseodymium, samarium, ytterbium, neodymium, lanthanum, gadolinium, cerium, dysprosium, erbium, titanium, and mixtures thereof. The particular concentrations of these additives that can be present in the abrasive dispersion can be varied based on skill in the art. Further details concerning methods of making sol-gel-derived abrasive particles can be found in, for example, U.S. Pat. No. 4,314,827 (Leitheiser), U.S. Pat. No. 5,152,917 (Pieper et al.), U.S. Pat. No. 5,213,591 (Celikkaya et al.), U.S. Pat. No. 5,435,816 (Spurgeon et al.), U.S. Pat. No. 5,672,097 (Hoopman et al.), U.S. Pat. No. 5,946,991 (Hoopman et al.), U.S. Pat. No. 5,975,987 (Hoopman et al.), and U.S. Pat. No. 6,129,540 (Hoopman et al.), and in U.S. Publ. Pat. Appln. Nos. 2009/0165394 A1 (Culler et al.) and 2009/0169816 A1 (Erickson et al.).

While illustrated as rod-shaped or truncated-pyramid shaped, ceramic particles may be shaped (e.g., precisely-shaped) or random (e.g., crushed and/or platey). Shaped ceramic particles and precisely-shaped ceramic particles may be prepared by a molding process using sol-gel technology as described, for example, in U.S. Pat. No. 5,201,916 (Berg), U.S. Pat. No. 5,366,523 (Rowenhorst (Re 35,570)), U.S. Pat. No. 5,984,988 (Berg), U.S. Pat. No. 8,142,531 (Adefris et al.), and U.S. Pat. No. 8,764,865 (Boden et al.).

U.S. Pat. No. 8,034,137 (Erickson et al.) describes ceramic alumina particles that have been formed in a specific shape, then crushed to form shards that retain a portion of their original shape features. In some embodiments, the ceramic particles are precisely-shaped (i.e., the ceramic particles have shapes that are at least partially determined by the shapes of cavities in a production mold used to make them).

Exemplary shapes of ceramic particles include crushed, pyramids (e.g., 3-, 4-, 5-, or 6-sided pyramids), truncated pyramids (e.g., 3-, 4-, 5-, or 6-sided truncated pyramids), cones, truncated cones, rods (e.g., cylindrical, vermiform), and prisms (e.g., 3-, 4-, 5-, or 6-sided prisms). In some embodiments (e.g., truncated pyramids and prisms), the ceramic particles respectively comprise platelets having two opposed major facets connected to each other by a plurality of side facets.

In some embodiments, the ceramic particles preferably comprise crushed abrasive particles having an aspect ratio of at least 1.73, at least 2, at least 3, at least 5, or even at least 10.

Preferably, ceramic particles used in practice of the present disclosure have a core hardness of at least 6, at least 7, at least 8, or at least 15 GPa.

Further details concerning ceramic particles suitable for use as abrasive particles and methods for their preparation can be found, for example, in U.S. Pat. No. 8,142,531 (Adefris et al.), U.S. Pat. No. 8,142,891 (Culler et al.), and U.S. Pat. No. 8,142,532 (Erickson et al.), and in U.S. Pat. Appl. Publ. Nos. 2012/0227333 (Adefris et al.), 2013/0040537 (Schwabel et al.), and 2013/0125477 (Adefris).

The thickness of the ferrite coating is at least 1 µm, in one embodiment. However, the thickness may be at least 5 µm, at least 10 µm, at least 25 µm, at least 50 µm, at least 100 µm, or at least 500 µm.

The magnetic moment, per total weight, of a magnetizable abrasive particle is preferably at least 1, 2, 3, 4, 5, 6, 7, 8, or 10 emu/g. In some embodiments, the magnetic saturation of the ferrite coating is greater than 10. In one embodiment, the magnetic saturation of the ferrite coating is greater than 15 emu/g.

In some embodiments, a ratio of magnetic remanence ($M_R$) to magnetic saturation ($M_S$) of is less than 10%. However, the ratio of $M_R/M_S$ may be less than 8%, or less than 7%, or less than 6%, or less than 5%, or less than 4%, or less than 3%.

Figure 2:
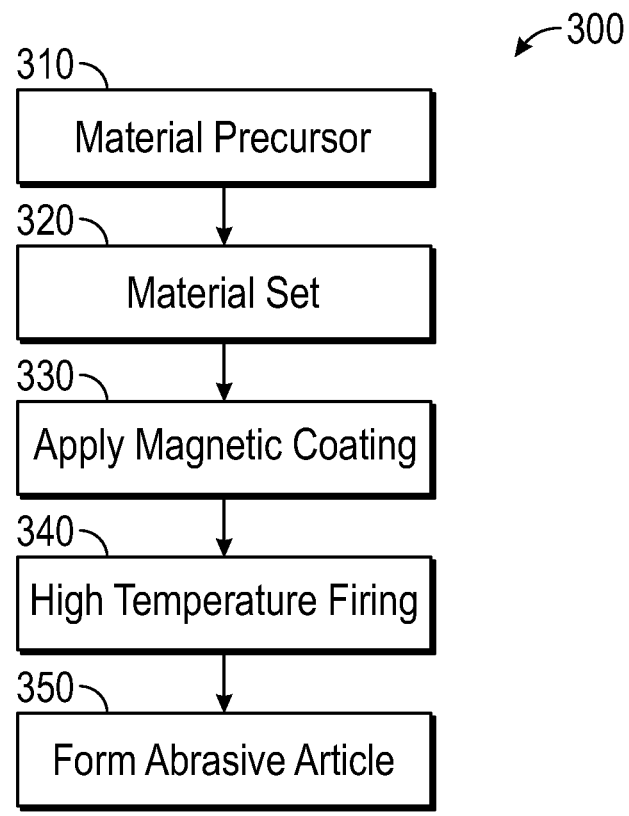
FIG. 2 illustrates a method of making magnetizable abrasive particles in an embodiment of the present invention.

FIG. 2 illustrates a method of making magnetizable abrasive particles in an embodiment of the present invention. Method 300 of making magnetizable abrasive particles according to the present disclosure includes a series of sequential steps. In some embodiments, the steps of method 300 are carried out consecutively. However, this is not required for all embodiments. Additionally, while steps 310, 320, 330, 340 and 350 are described, some embodiments may include only a subset of these steps, while other embodiments may include additional steps.

In step 310, particle precursor material is provided. For example, in one embodiment, precursor material can be provided as either a slurry or a sol-gel. In one embodiment, precursor material is provided to a tool with a plurality of mold cavities, such that precursor particles are formed having the negative image of the mold cavities. However, it is also envisioned that the provided material is randomly shaped abrasive material, for example "platey" shaped abrasive particles or randomly shaped crushed abrasive particles. Additionally, other materials may also be provided that require a magnetic coating prior to a firing step.

In step 320, the material undergoes a setting step. For example, a sol-gel or slurry based abrasive particle precursor material may undergo an initial drying step or an initial heating step. However, it is expressly contemplated that, in some embodiments, step 320 is not required. For example, in some embodiments, coating material is provided (as described below in step 330) to a mold cavity before precursor material has solidified. This may allow for a transition zone to form between the abrasive precursor portion and a coating portion.

In step 330, magnetic coating material is provided. The magnetic coating may be a continuous coating 338, for example that coats an entire abrasive particle, or at least coats an entire surface of an abrasive particle. In another embodiment, a continuous coating refers to a coating present with no uncoated portions on the coated surface. In one embodiment, the coating is a unitary coating 336—formed of a single layer of magnetic material and not as discrete magnetic particulates. In one embodiment, the magnetic coating is provided as a layer 334 on an abrasive particle while the particle is still in a mold cavity, such that the magnetic coating directly contacts an abrasive particle precursor surface. In one embodiment, the thickness of the magnetic coating is at most equal to, or preferably less than, a thickness of the abrasive particle. In one embodiment, the magnetic coating is not more than about 20 wt. % of the final particle, or not more than about 10 wt. % of the final particle, or not more than 5 wt. % of the final particle. However, other coating methods are also possible—for example the magnetic coating may be applied as a spray coating 332, which may result in some areas of an abrasive particle that receive a magnetic coating and other areas that receive less, or no, magnetic coating material. In some embodiments, the coating is a non-continuous and non-uniform coating.

In step 340, the coated material undergoes a high temperature firing. For example, an abrasive particle precursor may undergo calcining at temperatures up to about 400° C., or up to about 500° C., or up to about 600° C., or up to about 700° C., or up to about 800° C. Abrasive particle precursors may also undergo a sintering step at temperatures up to about 1250° C., or up to about 1400° C., or up to about 1500° C. Most magnetic materials decompose at such high temperatures into non-magnetic forms. However, in embodiments of the present invention, the magnetically coated material is still responsive to a magnetic field after firing at high temperatures.

In step 350, magnetically coated abrasive particles are used to create an abrasive article as described in greater detail below. In one embodiment, a magnetically coated abrasive particle can have a magnetically induced dipole after firing, such that it can be oriented within an abrasive article in a desired orientation. For example, the abrasive particle may be oriented on a backing, within a nonwoven web, or within a bonded article.

Magnetizable abrasive particles and/or ceramic particles used in their manufacture according to the present disclosure may be independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). ANSI grade designations (i.e., specified nominal grades) include, for example: ANSI 4, ANSI 6, ANSI 8, ANSI 16, ANSI 24, ANSI 36, ANSI 46, ANSI 54, ANSI 60, ANSI 70, ANSI 80, ANSI 90, ANSI 100, ANSI 120, ANSI 150, ANSI 180, ANSI 220, ANSI 240, ANSI 280, ANSI 320, ANSI 360, ANSI 400, and ANSI 600. FEPA grade designations include F4, F5, F6, F7, F8, F10, F12, F14, F16, F16, F20, F22, F24, F30, F36, F40, F46, F54, F60, F70, F80, F90, F100, F120, F150, F180, F220, F230, F240, F280, F320, F360, F400, F500, F600, F800, F1000, F1200, F1500, and F2000. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Alternatively, magnetizable abrasive particles and/or ceramic particles used in their manufacture according to the present disclosure can be graded to a nominal screened grade using U.S.A. Standard Test Sieves conforming to ASTM E-11 "Standard Specification for Wire Cloth and Sieves for Testing Purposes". ASTM E-11 prescribes the requirements for the design and construction of testing sieves using a medium of woven wire cloth mounted in a frame for the classification of materials according to a designated particle size. Abrasive particles may come in a range of sizes from, for example, about 25 µm to about 2000 µm. A typical designation may be represented as −18+20 meaning that the ceramic particles pass through a test sieve meeting ASTM E-11 specifications for the number 18 sieve and are retained on a test sieve meeting ASTM E-11 specifications for the number 20 sieve. In one embodiment, the ceramic particles have a particle size such that most of the particles pass through an 18 mesh test sieve and can be retained on a 20, 25, 30, 35, 40, 45, or 50 mesh test sieve. In various embodiments, the ceramic particles can have a nominal screened grade of: −18+20, −20+25, −25+30, −30+35, −35+40, −40+45, −45+50, −50+60, −60+70, −70+80, −80+100, −100+120, −120+140, −140+170, −170+200, −200+230, −230+270, −270+325, −325+400, −400+450, −450+500, or −500+635. Alternatively, a custom mesh size can be used such as −90+100.

Magnetizable abrasive particles prepared according to the present disclosure can be used in loose form (e.g., free-flowing or in a slurry) or they may be incorporated into various abrasive articles (e.g., coated abrasive articles, bonded abrasive articles, nonwoven abrasive articles, and/or abrasive brushes). Due to their anisotropic magnetic properties, the magnetizable abrasive particles can be oriented and manipulated using a magnetic field to provide the above various abrasive articles with controlled abrasive particle orientation and position.

In one embodiment, the method of making an abrasive article comprises:
a) providing the magnetizable abrasive particles described herein on a substrate having a major surface; and
b) applying a magnetic field to the magnetizable abrasive particles such that a majority of the magnetizable abrasive particles are oriented substantially perpendicular to the major surface.

If no magnetic field is applied in step b), then the resultant magnetizable abrasive particles may not have a magnetic moment, and the constituent abrasive particles, or magnetizable abrasive particles may be randomly oriented. However, when a sufficient magnetic field is applied the magnetizable abrasive particles will tend to align with the magnetic field. In favored embodiments, the ceramic particles have a major axis (e.g. aspect ratio of 2) and the major axis aligns parallel to the magnetic field. Preferably, a majority or even all of the magnetizable abrasive particles will have magnetic moments that are aligned substantially parallel to one another.

The magnetic field can be supplied by any external magnet (e.g., a permanent magnet or an electromagnet). In some embodiments, the magnetic field typically ranges from 0.5 to 1.5 kOe. Preferably, the magnetic field is substantially uniform on the scale of individual magnetizable abrasive particles.

For production of abrasive articles, a magnetic field can optionally be used to place and/or orient the magnetizable abrasive particles prior to curing the binder (e.g., vitreous or organic) precursor to produce the abrasive article. The magnetic field may be substantially uniform over the magnetizable abrasive particles before they are fixed in position in the binder or continuous over the entire, or it may be uneven, or even effectively separated into discrete sections. Typically, the orientation of the magnetic field is configured to achieve alignment of the magnetizable abrasive particles according to a predetermined orientation.

Examples of magnetic field configurations and apparatuses for generating them are described in U.S. Pat. No. 8,262,758 (Gao) and U.S. Pat. No. 2,370,636 (Carlton), U.S. Pat. No. 2,857,879 (Johnson), U.S. Pat. No. 3,625,666 (James), U.S. Pat. No. 4,008,055 (Phaal), U.S. Pat. No. 5,181,939 (Neff), and British (G. B.) Pat. No. 1 477 767 (Edenville Engineering Works Limited).

In some embodiments, a magnetic field may be used to deposit the magnetizable abrasive particles onto the binder precursor of a coated abrasive article while maintaining a vertical or inclined orientation relative to a horizontal backing. After drying and/or at least partially curing the binder precursor, the magnetizable abrasive particles are fixed in their placement and orientation. Alternatively, or in addition, the presence or absence of strong magnetic field can be used to selectively place the magnetizable abrasive particles onto the binder precursor. An analogous process may be used for manufacture of slurry coated abrasive articles, except that the magnetic field acts on the magnetizable particles within the slurry. The above processes may also be carried out on nonwoven backings to make nonwoven abrasive articles.

Likewise, in the case of bonded abrasive article, the magnetizable abrasive particles can be positioned and/or orientated within the corresponding binder precursor, which is then pressed and cured.

Figure 3:
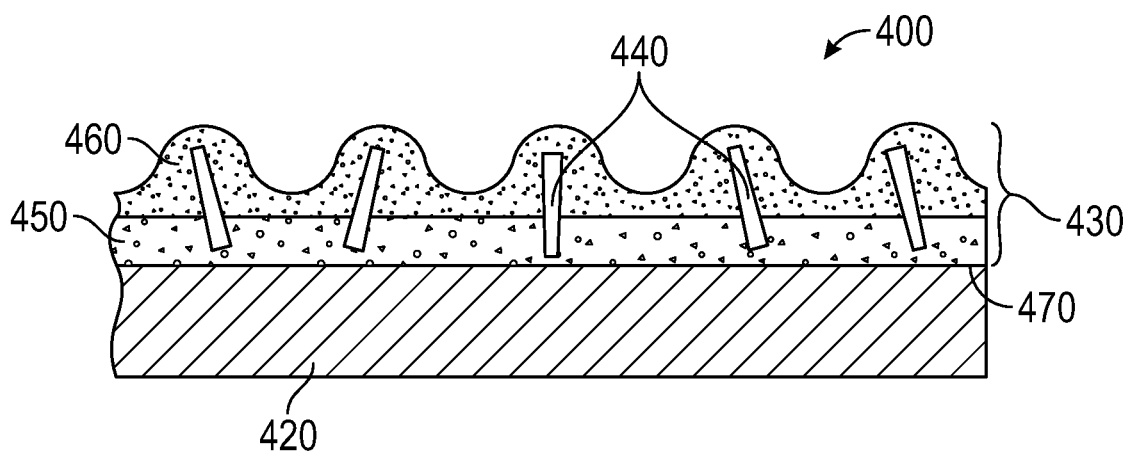
FIG. 3 is a cross-sectional view of a coated abrasive article according to an embodiment of the present invention.

FIG. 3 is a cross-sectional view of a coated abrasive article according to an embodiment of the present invention. Referring to FIG. 3, an illustrative coated abrasive article 400 has backing 420 and abrasive layer 430. Abrasive layer 430, includes magnetizable abrasive particles 440 according to the present disclosure secured to surface 470 of backing 420 by binder layer 450. The coated abrasive article 400 may further comprise an optional size layer 460 that may comprise the same or different binder than binder layer 450. Various binder layers for abrasive articles are known including, for example, epoxy resin, urethane resin, phenolic resin, aminoplast resin, or acrylic resin.

Previous attempts at creating magnetically responsive abrasive particles focused on applying a coating after an abrasive particle had undergone a sintering process. It was thought that co-sintering two non-identical materials, such as an abrasive particle precursor and a magnetic coating material, would lead to cracking between the two layers. Applying coating to alumina-based abrasive particles had previously resulting in cracking when the coated particles underwent a firing process. Some cracking can be seen in the results illustrated in FIGS. 5C and 6C, which represent initial experimentation.

Surprisingly, examination of the particles described herein illustrated that not only did the particles not experience cracking between the abrasive particle layer and the coating layer, but instead saw a third layer.

Figure 4A:
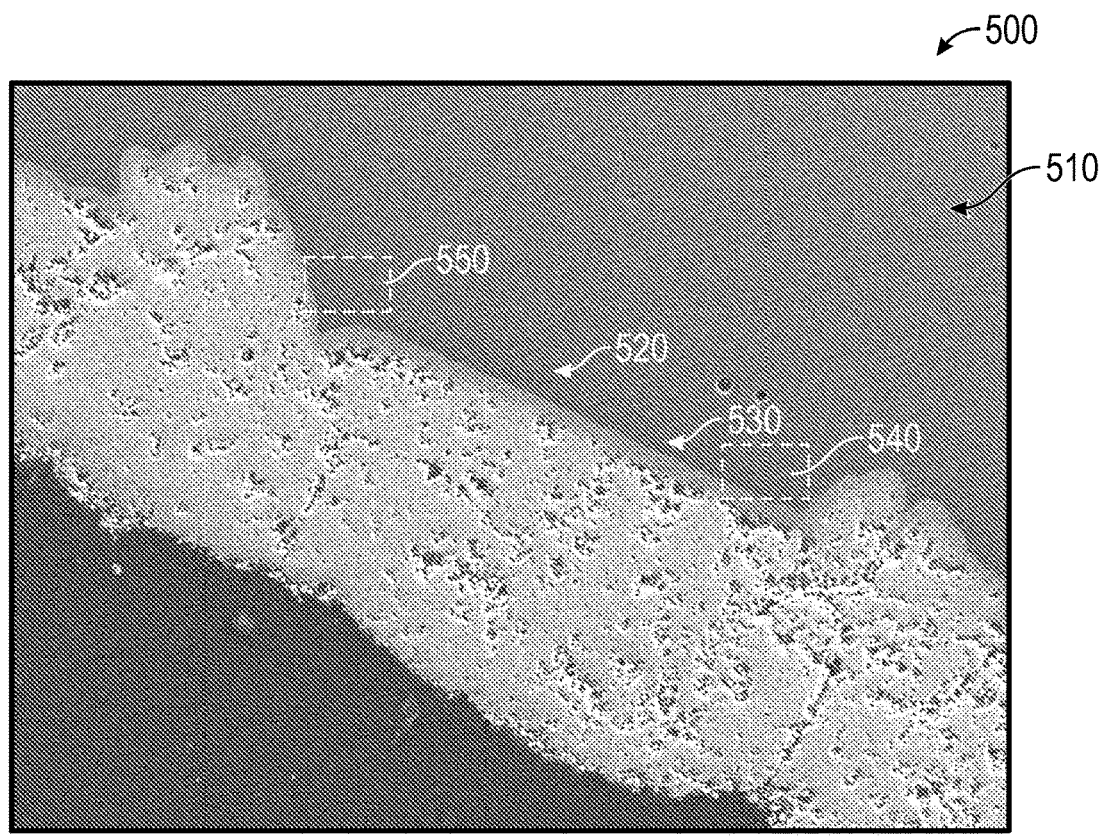
FIGS. 4A-4C illustrate SEM photos of magnetically coated abrasive particles according to one embodiment of the present invention.
Figure 4B:
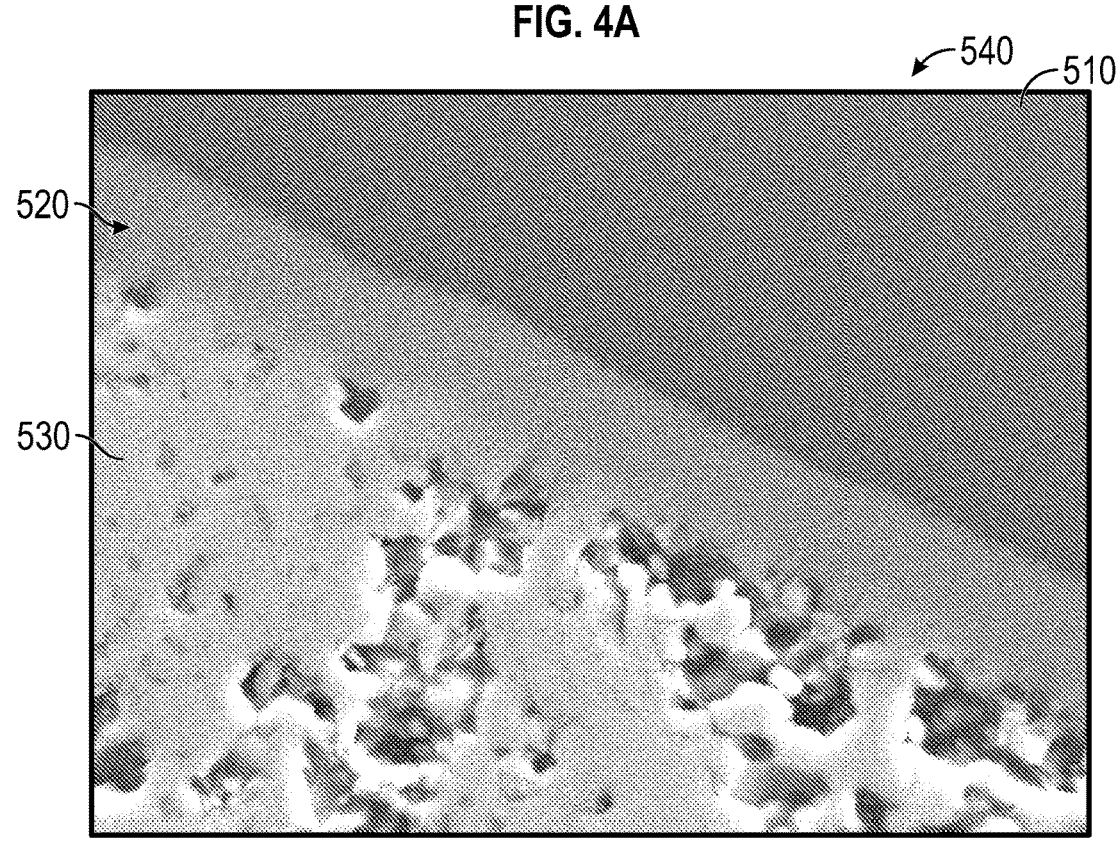
Figure 4C:
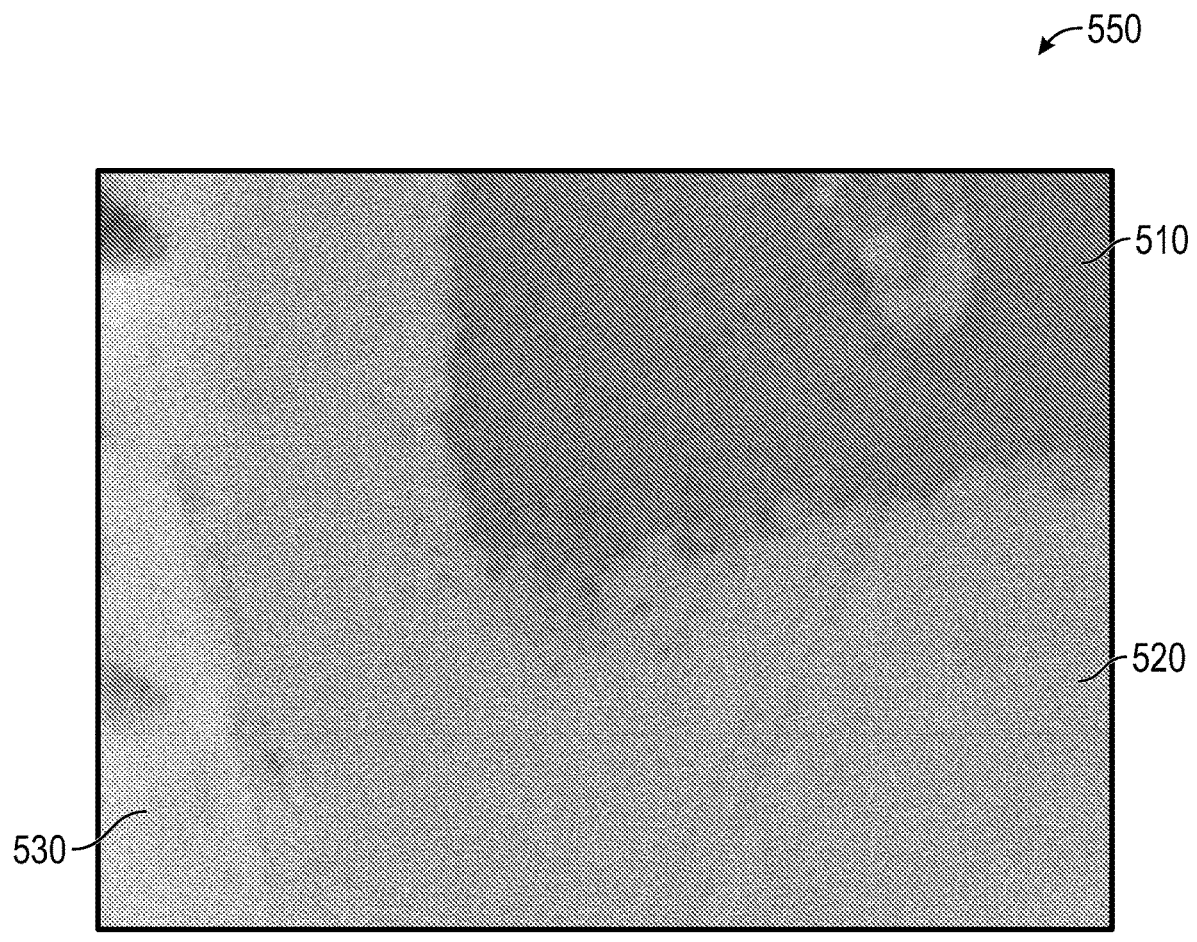

FIGS. 4A-4C illustrate SEM photos of magnetically coated abrasive particles in one embodiment of the present invention. The photos in FIGS. 4A-4C illustrate scanning electron microscope (SEM) photographs taken of a ferrite-coated seeded abrasive particle 500. The SEM photos were taken to evaluate whether the inclusion of a coating layer had disrupted the sintering process of the ceramic particle layer. It was expected that there would be cracking between an abrasive layer 510 and a magnetic coating layer 530. Surprisingly, instead of experiencing cracking, a third layer 520 had formed during the firing process. Third layer 520 is a reaction layer formed between abrasive layer 510 and magnetic coating layer 530 during the high temperature sintering process. The presence of a reaction layer was also surprising because of the difference in particle size between the coating layer and the ceramic layer.

FIG. 4B illustrates a close-up view of portion 540 of image 500. FIG. 4C illustrates a close-up view of portion 550 of image 500. Reaction layer 520 includes zinc and aluminum, in one embodiment. Reaction layer 530 may also include iron and nickel.

Further details concerning the manufacture of coated abrasive articles according to the present disclosure can be found in, for example, U.S. Pat. No. 4,314,827 (Leitheiser et al.), U.S. Pat. No. 4,652,275 (Bloecher et al.), U.S. Pat. No. 4,734,104 (Broberg), U.S. Pat. No. 4,751,137 (Tumey et al.), U.S. Pat. No. 5,137,542 (Buchanan et al.), U.S. Pat. No. 5,152,917 (Pieper et al.), U.S. Pat. No. 5,417,726 (Stout et al.), U.S. Pat. No. 5,573,619 (Benedict et al.), U.S. Pat. No. 5,942,015 (Culler et al.), and U.S. Pat. No. 6,261,682 (Law).

Nonwoven abrasive articles typically include a porous (e.g., a lofty open porous) polymer filament structure having magnetizable abrasive particles bonded thereto by a binder. Further details concerning the manufacture of nonwoven abrasive articles according to the present disclosure can be found in, for example, U.S. Pat. No. 2,958,593 (Hoover et al.), U.S. Pat. No. 4,018,575 (Davis et al.), U.S. Pat. No. 4,227,350 (Fitzer), U.S. Pat. No. 4,331,453 (Dau et al.), U.S. Pat. No. 4,609,380 (Barnett et al.), U.S. Pat. No. 4,991,362 (Heyer et al.), U.S. Pat. No. 5,554,068 (Carr et al.), U.S. Pat. No. 5,712,210 (Windisch et al.), U.S. Pat. No. 5,591,239 (Edblom et al.), U.S. Pat. No. 5,681,361 (Sanders), U.S. Pat. No. 5,858,140 (Berger et al.), U.S. Pat. No. 5,928,070 (Lux), U.S. Pat. No. 6,017,831 (Beardsley et al.), U.S. Pat. No. 6,207,246 (Moren et al.), and U.S. Pat. No. 6,302,930 (Lux).

Abrasive articles according to the present disclosure are useful for abrading a workpiece. Methods of abrading range from snagging (i.e., high pressure high stock removal) to polishing (e.g., polishing medical implants with coated abrasive belts), wherein the latter is typically done with finer grades of abrasive particles. One such method includes the step of frictionally contacting an abrasive article (e.g., a coated abrasive article, a nonwoven abrasive article, or a bonded abrasive article) with a surface of the workpiece, and moving at least one of the abrasive article or the workpiece relative to the other to abrade at least a portion of the surface.

Examples of workpiece materials include metal, metal alloys, exotic metal alloys, ceramics, glass, wood, wood-like materials, composites, painted surfaces, plastics, reinforced plastics, stone, and/or combinations thereof. The workpiece may be flat or have a shape or contour associated with it. Exemplary workpieces include metal components, plastic components, particleboard, camshafts, crankshafts, furniture, and turbine blades.

Abrasive articles according to the present disclosure may be used by hand and/or used in combination with a machine. At least one of the abrasive article and the workpiece is moved relative to the other when abrading. Abrading may be conducted under wet or dry conditions. Exemplary liquids for wet abrading include water, water containing conventional rust inhibiting compounds, lubricant, oil, soap, and cutting fluid. The liquid may also contain defoamers, degreasers, for example.

The following embodiments are intended to be illustrative of the present disclosure and not limiting.

A magnetizable abrasive particle is presented. The magnetizable abrasive particle has an outer surface. The magnetizable abrasive particle has a magnetic coating layer applied to the outer surface of the ceramic particle prior to sintering. The sintered magnetizable particle is responsive to a magnetic field.

The magnetizable abrasive particle may be implemented such that it includes a reaction layer between the ceramic particle and the ferrite coating layer, the reaction layer comprising chemical bonding at an interface between the ceramic particle and the ferrite coating layer.

The magnetizable abrasive particle may be implemented such that the ceramic particle is a fully dense ceramic particle.

The magnetizable abrasive particle may be implemented such that the ceramic particle is a ceramic particle precursor.

The magnetizable abrasive particle may be implemented such that the reaction layer forms during sintering.

The magnetizable abrasive particle may be implemented such that the reaction layer includes at least one of alumina, zinc, iron or nickel.

The magnetizable abrasive particle may be implemented such that the ferrite coating layer has 80% of theoretical density.

The magnetizable abrasive particle may be implemented such that the ferrite coating is on a single surface of the ceramic particle.

The magnetizable abrasive particle may be implemented such that the ferrite coating has a formula of $XO \cdot M_m Fe_{2-m}O_3$ (m<1) where X is a divalent cation and M is a trivalent cation.

The magnetizable abrasive particle may be implemented such that X is magnesium, manganese, zinc, copper, nickel, cobalt, iron or cadmium.

The magnetizable abrasive particle may be implemented such that M is aluminum, scandium, chromium, manganese or iron.

The magnetizable abrasive particle may be implemented such that the ferrite coating has a formula of $X_3 A_5 O_{12}$, where X and A are metals.

E The magnetizable abrasive particle may be implemented such that the ferrite coating includes $Y_3 Fe_5 O_{12}$.

The magnetizable abrasive particle may be implemented such that X is iron, gallium, germanium, aluminum, silicon, vanadium, scandium, indium, titanium, zirconium, tin, iridium, or antimony.

The magnetizable abrasive particle may be implemented such that A is yttrium, bismuth, calcium, gadolinium, neodymium, samarium, praseodymium, lead, lanthanum, holmium, erbium, ytterbium, or lutetium.

The magnetizable abrasive particle may be implemented such that the ferrite coating is a unitary layer.

The magnetizable abrasive particle may be implemented such that the ceramic particle is sintered at a temperature above 1000° C.

The magnetizable abrasive particle may be implemented such that the ceramic is sintered at a temperature above 1300° C.

The magnetizable abrasive particle may be implemented such that the magnetized abrasive particle, after firing, has a magnetically induced dipole when exposed to a magnetic field.

The magnetizable abrasive particle may be implemented such that the ferrite coating layer includes a soft magnetic material.

The magnetizable abrasive particle may be implemented such that after firing, the abrasive particle has a coercivity of less than 50 Oe.

The magnetizable abrasive particle may be implemented such that after firing, the abrasive particle has a coercivity of less than 20 Oe.

The magnetizable abrasive particle may be implemented such that after firing, the abrasive particle has a ratio of magnetic remanence to magnetic saturation of less than 8%.

The magnetizable abrasive particle may be implemented such that the ceramic particle includes alpha-alumina, zirconia, stabilized zirconia, mullite, zirconia toughened alumina, spinel, aluminosilicates, perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, diamond, cubic boron nitride and the like, or a combination thereof.

The magnetizable abrasive particle may be implemented such that the ceramic particle is a sol-gel derived ceramic includes an alumina ceramic doped with chromia, ceria, zirconia, titania, silica, or tin oxide.

The magnetizable abrasive particle may be implemented such that the ceramic particle includes alpha alumina.

The magnetizable abrasive particle may be implemented such that the ceramic particle, prior to receiving a magnetic coating, is substantially unresponsive to a magnetic field.

The magnetizable abrasive particle may be implemented such that the ceramic particle is a shaped abrasive particle.

The magnetizable abrasive particle may be implemented such that the ceramic particle is a shaped ceramic particle.

The magnetizable abrasive particle may be implemented such that the shape is a polygonal shape comprising a pyramid, a truncated pyramid, a cone, a truncated cone, a cylinder, a rod, a tetrahedron or a prism.

The magnetizable abrasive particle may be implemented such that the magnetic coating is at least 1 µm.

The magnetizable abrasive particle may be implemented such that the magnetic coating is at least 50 µm.

The magnetizable abrasive particle may be implemented such that the magnetic coating is at least 500 µm.

The magnetizable abrasive particle may be implemented such that the core hardness of the ceramic particle is at least 15 GPa.

The magnetizable abrasive particle may be implemented such that the ferrite coating layer is binderless.

A method of making magnetizable abrasive particles is presented. The method includes providing a ceramic particle precursor. The method also includes coating the ceramic particle precursor with a magnetic coating. The method also includes firing the magnetic coated ceramic particle precursor to create a sintered ferrite-coated ceramic particle. After firing, the magnetic coated ceramic abrasive particle is responsive to a magnetic field.

The method may be implemented such that it also includes removing solvent from the ceramic particle precursor.

The method may be implemented such that removing solvent includes a pre-firing process.

The method may be implemented such that firing the magnetic coated ceramic particle causes a reaction layer to form between a metal coating layer and a ceramic particle layer.

The method may be implemented such that the reaction layer includes alumina, zinc, iron or nickel.

The method may be implemented such that coating includes a binderless coating.

The method may be implemented such that coating includes applying the magnetic coating to a surface of the ceramic particle precursor.

The method may be implemented such that coating includes applying the magnetic coating to substantially all surfaces of the ceramic particle precursor.

The method may be implemented such that the magnetic coating is a ferrite coating.

The method may be implemented such that the ferrite coating has a formula of $XO \cdot M_m Fe_{2-m} O_3$ (m<1) where X is a divalent cation and M is a trivalent cation.

The method may be implemented such that X is magnesium, manganese, zinc, copper, nickel, cobalt, iron or cadmium.

The method may be implemented such that M is aluminum, scandium, chromium, manganese or iron.

The method may be implemented such that the magnetic coating has a formula of $X_3 A_5 O_{12}$, where X and A are metals.

The method may be implemented such that the magnetic coating is $Y_3 Fe_5 O_{12}$.

The method may be implemented such that X is iron, gallium, germanium, aluminum, silicon, vanadium, scandium, indium, titanium, zirconium, tin, iridium, or antimony.

The method may be implemented such that A is yttrium, bismuth, calcium, gadolinium, neodymium, samarium, praseodymium, lead, lanthanum, holmium, erbium, ytterbium, or lutetium.

The method may be implemented such that the coating is a unitary coating.

The method may be implemented such that the coating is substantially limited to a single side of the ceramic particle precursor.

The method may be implemented such that the magnetic coating includes a soft magnetic material.

The method may be implemented such that the coating includes applying a slurry of ferrite coating material.

The method may be implemented such that the ferrite coating includes a nickel zinc ferrite material.

The method may be implemented such that the ceramic particle precursor is formed within a tool having a mold cavity, such that the ceramic particle precursor has a shape that is a negative image of the mold cavity.

The method may be implemented such that the ceramic particle precursor is formed from a sol-gel.

The method may be implemented such that the ceramic particle precursor is formed from a slurry.

The method may be implemented such that the ceramic particle precursor is a fully dense ceramic particle.

The method may be implemented such that coating includes applying the magnetic coating as a slurry while the ceramic particle precursor is in the mold cavity.

The method may be implemented such that the ceramic particle precursor is alpha alumina.

A method for making an abrasive article is presented that includes providing magnetizable abrasive particles on a substrate having a major surface. The method also includes applying a magnetic field to the magnetizable abrasive particles such that a majority of the magnetizable abrasive particles are oriented substantially perpendicular to the major surface. The method also includes applying a binder material to fix the magnetizable abrasive particles to the substrate.

EXAMPLES

The following working examples are intended to be illustrative of the present disclosure and not limiting.

Materials

The materials with their sources were as listed in Table 2. Unless stated otherwise, all other reagents were obtained, or are available from fine chemical vendors such as Sigma-Aldrich Company, St. Louis, Missouri, or may be synthesized by known methods.

TABLE 2

Material List

| Designation | Description | Source |
|---|---|---|
| Disperal | Boehmite aluminum oxide monohydrate powder powder | Sasol, Houston, TX, USA |
| BP40 | nickel zinc ferrite powder with an initial permeability of 40 | PPT, Valparaiso, IN, USA |
| BP860 | nickel zinc ferrite powder with an initial permeability of 860 | PPT, Valparaiso, IN, USA |
| Methocel | Methylcellulose | Dow Chemical Company, Midland, MI, USA |
| EAA film | 3M Scothpak ™ MA370M - metal adhesion packaging film | 3M Company, St Paul, MN, USA |
| resole phenolic resin | GP 8339 R-23155B | Georgia Pacific Chemicals, Atlanta, Georgia |
| fiber disc | Dynos vulcanized fibre | Dynos GmbH, Troisdorf, Germany |
| calcium metasilicate | Wollastocoat | NYCO Company, Willsboro, NY |
| crushed alumina | ANSI grade 80 aluminum oxide abrasive mineral | Washington Mills Electro Minerals Corporation, Niagara Falls, New York |

BP40 and BP860 are known soft magnetic ferrites with low and high permeabilities. Both have been known to be processed at temperatures in excess of 1000° C.

Magnetic Properties Test Method

The magnetic properties of the magnetic particles (powders) were tested at room temperature with a Lake Shore 7400 Series vibrating sample magnetometer (VSM) (Lake Shore Cryotronics, Inc., Westerville, OH, USA). The mass of the magnetic particles was measured (balance model MS105DU, Mettler Toledo, Switzerland) prior to the magnetic measurements. The mass of the empty VSM sample holder, similar to a Lake Shore Model 730935 (P/N 651-454), was used to zero the balance. For each sample, a new VSM holder was used. After the magnetic particles were loaded into the VSM sample holder (into the approximately 15 millimeter (mm) tap of the holder), the mass of powder was measured. To secure the powder in the tap of the holder, adhesive (3M SCOTCH-WELD Instant Adhesive ID No. 62-3801-0330-9, 3M Company, Maplewood, MN, USA) was applied. The adhesive dried for at least 4 hours prior to the measurement. The magnetic moment (emu) of the magnetic particles was measured at magnetic field H=18 kilooersted (kOe). The saturation magnetization $M_S$ per mass of the abrasive particles (emu/g) was calculated by dividing measured magnetic moment at 18 kOe to the mass of the magnetic particles. For magnetic powders the measured coercive force $H_c$ (Oe) and remnant magnetization $M_r/M_S$ was also recorded. These values were taken from the magnetization loops recorded by sweeping magnetic field H from +20 to −20 kOe. The sweeping speed of the magnetic field H for each measurement was 26.7 Oe/s.

SAP1 Synthesis

A sample of boehmite sol-gel was made using the following procedure: Disperal (1280 parts) was dispersed by high shear mixing a solution containing water (1800 parts) and 70% aqueous nitric acid (52 parts) for 11 minutes. The resulting sol-gel was aged for at least 1 hour before coating. The sol-gel was forced into production tooling having triangular shaped mold cavities of 28 mils (711.2 microns) depth and 110 mils (2794 microns) on each side. The draft angle α between the sidewall and bottom of the mold was 98 degrees. The sol-gel was forced into the cavities with a putty knife so that the openings of the production tooling were filled. A mold release agent, 0.2% peanut oil in methanol was used to coat the production tooling using a brush to fill the open mold cavities in the production tooling. The methanol evaporated in a fume hood at room temperature. The sol-gel coated production tooling was air-dried at room temperature for at least 10 minutes, giving a concentration of release agent (after evaporation of the methanol) of 0.08 mg/in$^2$, and an average thickness of the coating (prior to evaporation of the methanol) of 138 microns. The precursor shaped abrasive particles were removed from the production tooling by passing it over an ultrasonic horn. The precursor shaped abrasive particles were calcined at approximately 650° C. in a rotary tube kiln.

SAP2 Synthesis

A sample of boehmite sol-gel was made using the following procedure: Disperal (1280 parts) was dispersed by high shear mixing a solution containing water (1770 parts) and 70% aqueous nitric acid (52 parts) and a suspension of alpha alumina powder with surface area of 104 m$^2$/g at 40% solids (51 parts). The suspension of alpha alumina powder was produced by milling of alumina powder using horizontal bead mill (obtained from Buhler Inc. under trade designation of Centex S2). The resulting boehmite sol was mixed for a total of 11 minutes. The resulting sol-gel was aged for at least 1 hour before coating. The sol-gel was forced into production tooling having triangular shaped mold cavities of 28 mils (711.2 microns) depth and 110 mils (2794 microns) on each side. The draft angle α between the sidewall and bottom of the mold was 98 degrees. The sol-gel was forced into the cavities with a putty knife so that the mold openings of the production tooling were filled. A mold release agent, 0.2% peanut oil in methanol was used to coat the production tooling using a brush to fill the open mold cavities in the production tooling. The methanol evaporated in a fume hood at room temperature. The sol-gel coated production tooling was air-dried at room temperature for at least 10 minutes, giving a concentration of release agent (after evaporation of the methanol) of 0.08 mg/in$^r$, and an average thickness of the coating (prior to evaporation of the methanol) of 138 microns. The precursor shaped abrasive particles were removed from the production tooling by passing it over an ultrasonic horn. The precursor shaped abrasive particles were calcined at approximately 650° C. in a rotary tube kiln.

Example 1 (EX-1)

A solution of 70% aqueous nitric acid (6.6 g) was added to deionized water (232 g) and stirred. Disperal boehmite powder (160 g) was added together with a suspension of goethite (α-FeOOH) as an iron oxide source (20 g) and stirred for 3 min using Scott Turbon mixer at 1600 rpm. The goethite suspension was synthesized by aging a dispersion of ferric hydroxide at elevated temperature and high pH. Additional information on the preparation of iron oxides has been previously disclosed and details can be found in EP 0 833 803 B1. Subsequently, a solution of 70% aqueous nitric acid (0.6 g) was added and the sol stirred for an additional 2 minutes. The sol was allowed to age for 48 hours during which it turned into a gel. About 200 g of this gel was coated into a tool consisting of equilateral triangular shaped mold cavities of 88 mils on a side. The sol was spread into the cavities using a squeegee so that the openings of the production tooling were filled. A ferrite slurry of BP40 (20 g), Methocel (0.50 g), and water (20 g) was made by stirring with an impeller at 1000 RPM for one hour. Then about 10 g of the BP40 ferrite solution was coated on top of the alumina sol filled tooling with a squeegee. This was dried at ambient temperature for 16 hours. Following drying the sheet was vigorously vibrated with an ultrasonic horn to dislodge the resulting shaped abrasive precursor particles. The shaped abrasive precursor particles were calcined by placing them in an alumina crucible and heating to 700° C. (heating rate 5° C. per minute). Subsequently, the particles were sintered at 1380° C. (heating rate 10° C. per minute) in air. An isothermal hold at 1380° C. was applied for one hour. The resulting shaped abrasive particles were about 2.5 mm (side length)×0.50 mm (thickness).

Figure 5A:
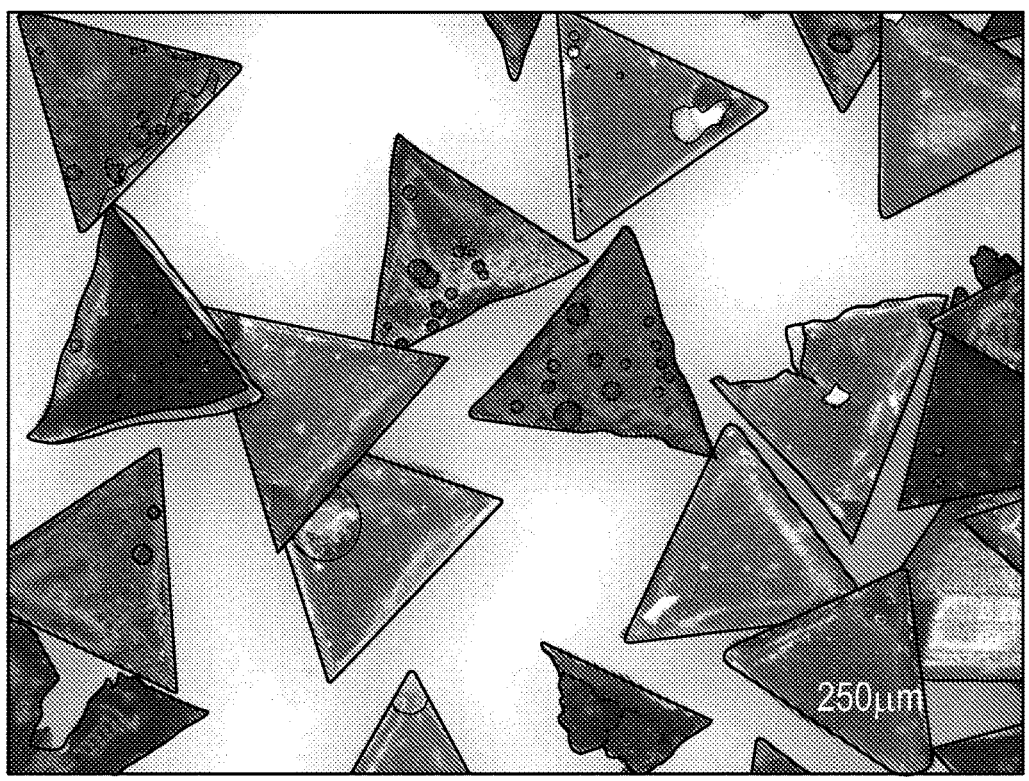
FIGS. 5A-5D illustrate the magnetizable particles made according to Example 1.
Figure 5B:
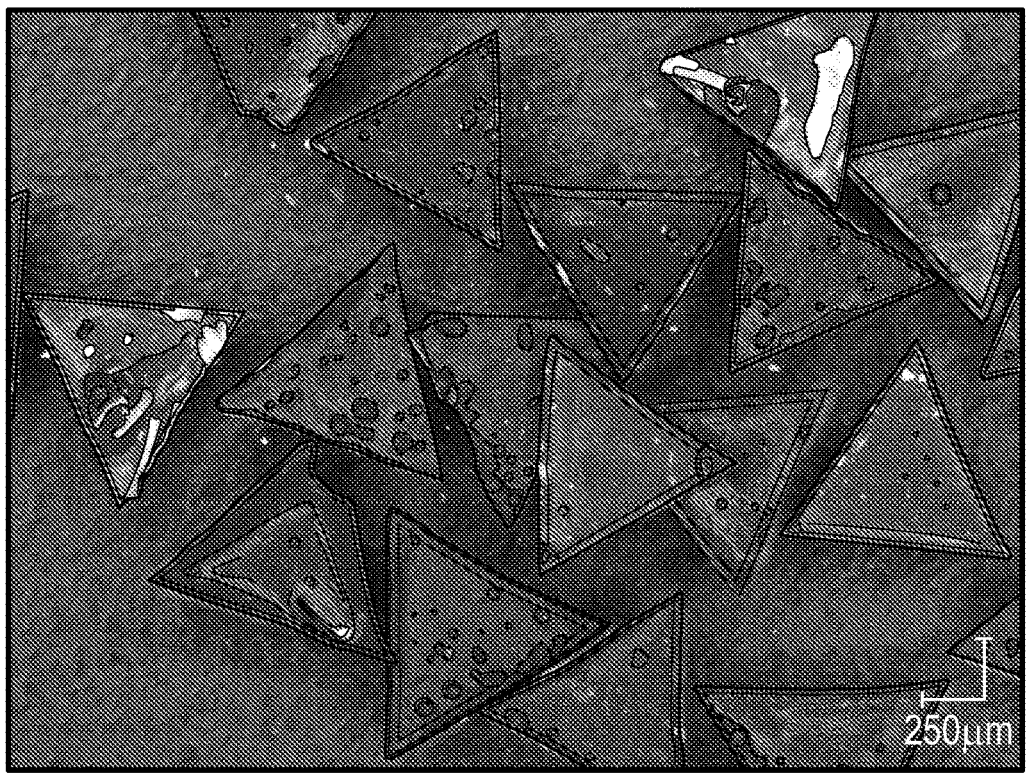
Figure 5C:
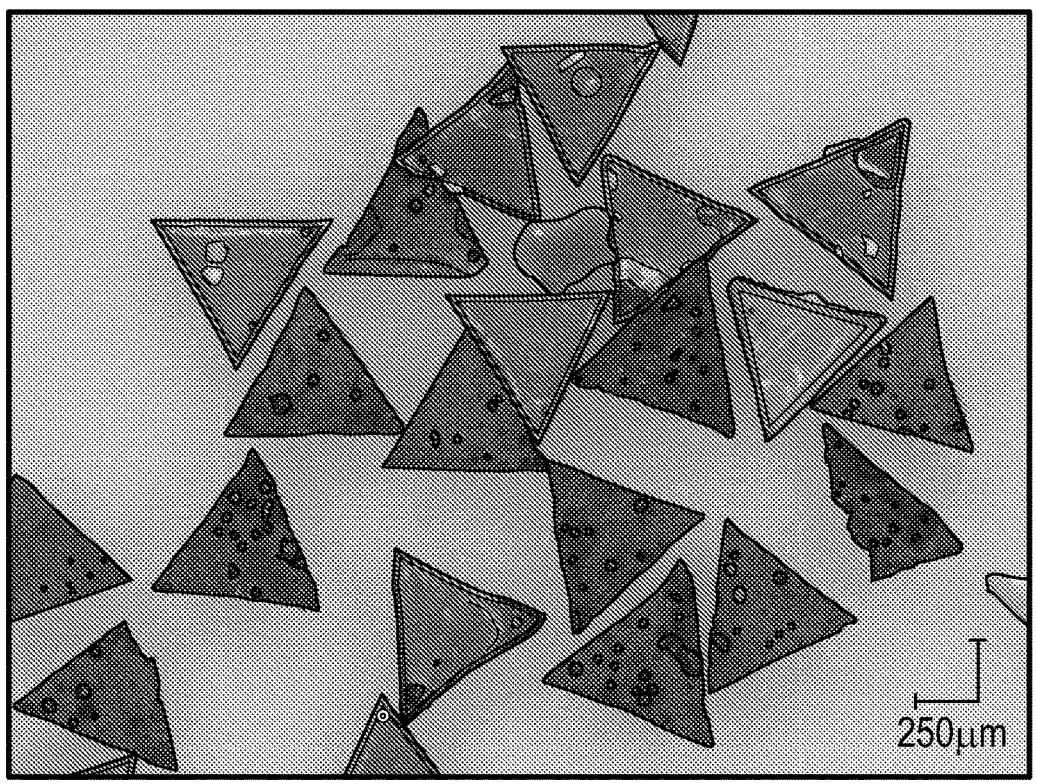
Figure 5D:
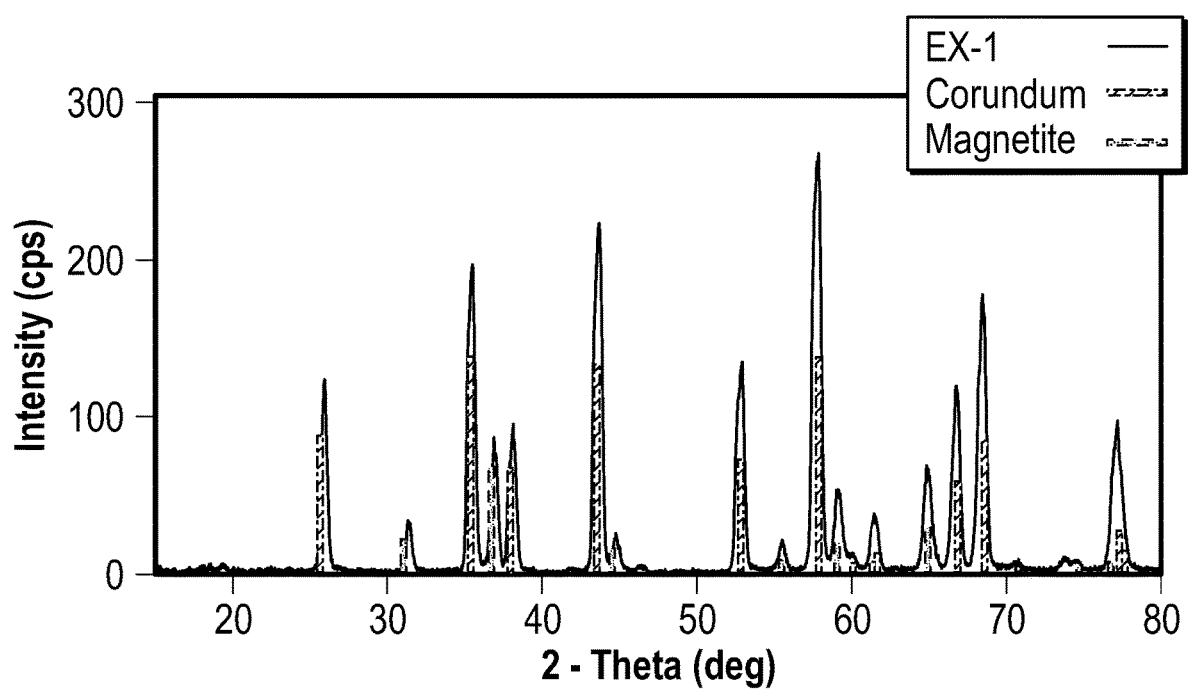

FIGS. 5A-5D illustrate the magnetizable particles made according to Example 1. FIG. 5A is an optical microscope image (50× magnification) of the particles after removal from the mold. FIG. 5B is an optical microscope image (50× magnification) of the particles after the pre-fire step. FIG. 5C is an optical microscope image (50× magnification) of the particles after firing. FIG. 5D is an X-ray powder diffractogram of the ferrite coated alumina with the peak positions of corundum and magnetite and their relative intensities represented by bars.

Example 2 (EX-2)

Alumina gel was prepared as described in Example 1. About 200 g of this gel was coated into a tool consisting of equilateral triangular shaped mold cavities of 88 mils on a side. The sol was spread into the cavities using a squeegee so that the openings of the production tooling were filled. This dried in the fume hood for 40 minutes. A ferrite slurry of BP860 (20 g), Methocel (0.50 g), and water (20 g) was made by stirring with an impeller at 1000 RPM for one hour. Then about 35 g of the BP860 ferrite solution was coated on top of the partially dried alumina sol filled tooling with a squeegee. This was dried at ambient temperature for 16 hours. Following drying the sheet was vigorously vibrated with an ultrasonic horn to dislodge the resulting shaped abrasive precursor particles. The shaped abrasive precursor particles were calcined by placing them in an alumina crucible and heating to 700° C. (heating rate 5° C./min). Subsequently the particles were sintered at 1380° C. (heating rate 10° C. per minute) in air. An isothermal hold at 1380° C. was applied for one hour. The resulting shaped abrasive particles were about 2.5 mm (side length)×0.50 mm (thickness).

Figure 6A:
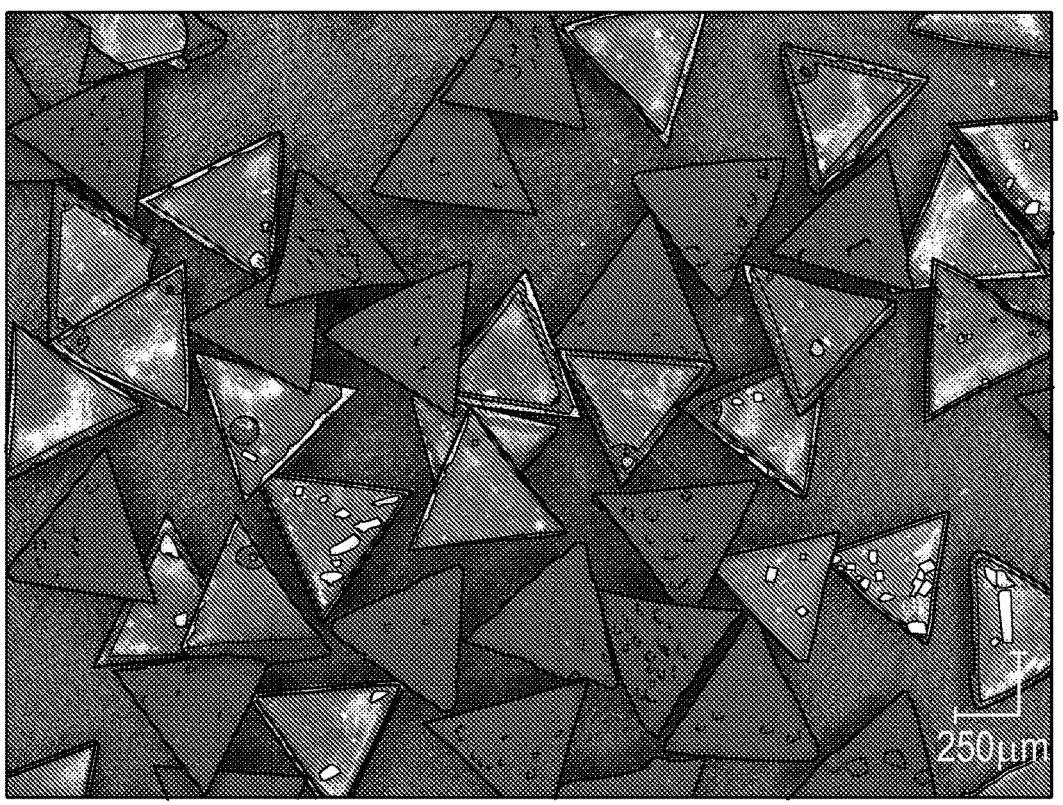
FIGS. 6A-6D illustrate the magnetizable particles made according to Example 2.
Figure 6B:
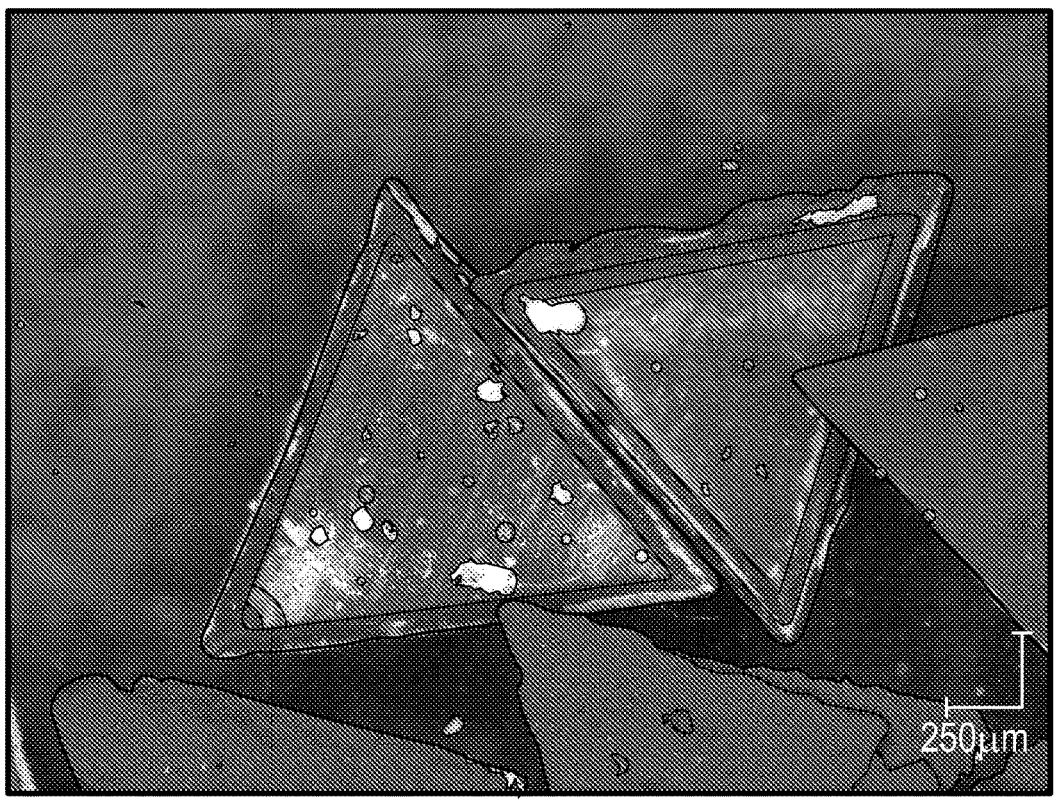
Figure 6C:
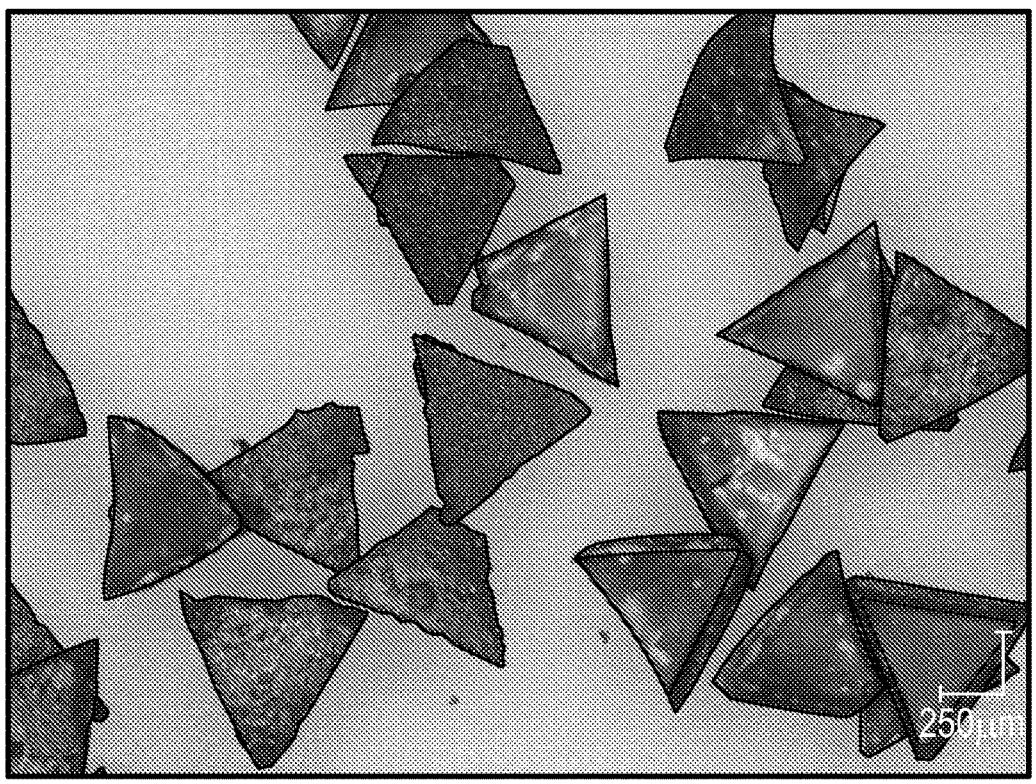
Figure 6D:
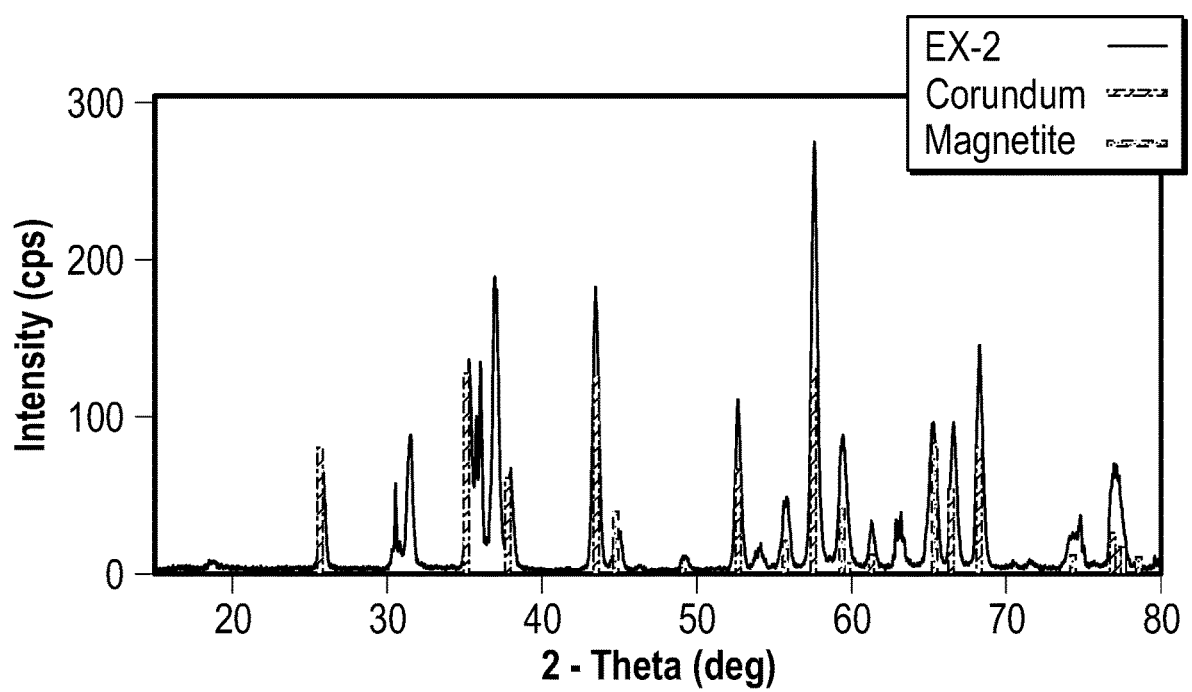

FIGS. 6A-6D illustrate the magnetizable particles made according to Example 2. FIG. 6A is an optical microscope image (30× magnification) of the particles as released from the mold. FIG. 6B is an optical microscope image (100× magnification) of the particles after the pre-fire step. FIG. 6C is an optical microscope image (50× magnification) of the particles after firing. FIG. 6D is an X-ray powder diffractogram of the ferrite coated alumina with the peak positions of corundum and magnetite and their relative intensities represented by bars.

Example 3 (EX-3)

A ferrite slurry of BP860 (250 g), Methocel (6.25 g), and water (400 g) was made by stirring with a Cowles blade at 3500 RPM for 20 minutes. Then about 10 g of the BP860 ferrite solution was coated onto an EAA film with an RDS No. 32 Mayer rod. The SAP1 particles were aligned in the same production tooling used during the initial step of molding, with triangular shaped mold cavities of 28 mils (711.2 microns) depth and 110 mils (2794 microns) to give essentially a monolayer of particles lying on one major face. These were transferred to the wet, slurry coated film. The tooling was removed and the film with the ferrite coating and SAP1 particles was placed in an oven at 200° F. This was removed from the oven after 45 minutes and the SAP1 particles were removed from the film with a plastic squeegee. The coated particles were fed into a rotary firing/sintering kiln. The firing/sintering kiln consisted of an 8.9 cm inner diameter, 1.32 m long silicon carbide tube inclined at 4.4° with respect to the horizontal and had a 31 cm hot zone. The heat was applied externally via SiC electric heating elements. The sintering kiln rotated at 6.0 rpm, to provide a residence time in the tube of about 5 minutes. The firing/sintering temperature was about 1430° C. The product exited the kiln into room temperature air where it was collected in a metal container and allowed to cool.

Figure 7:
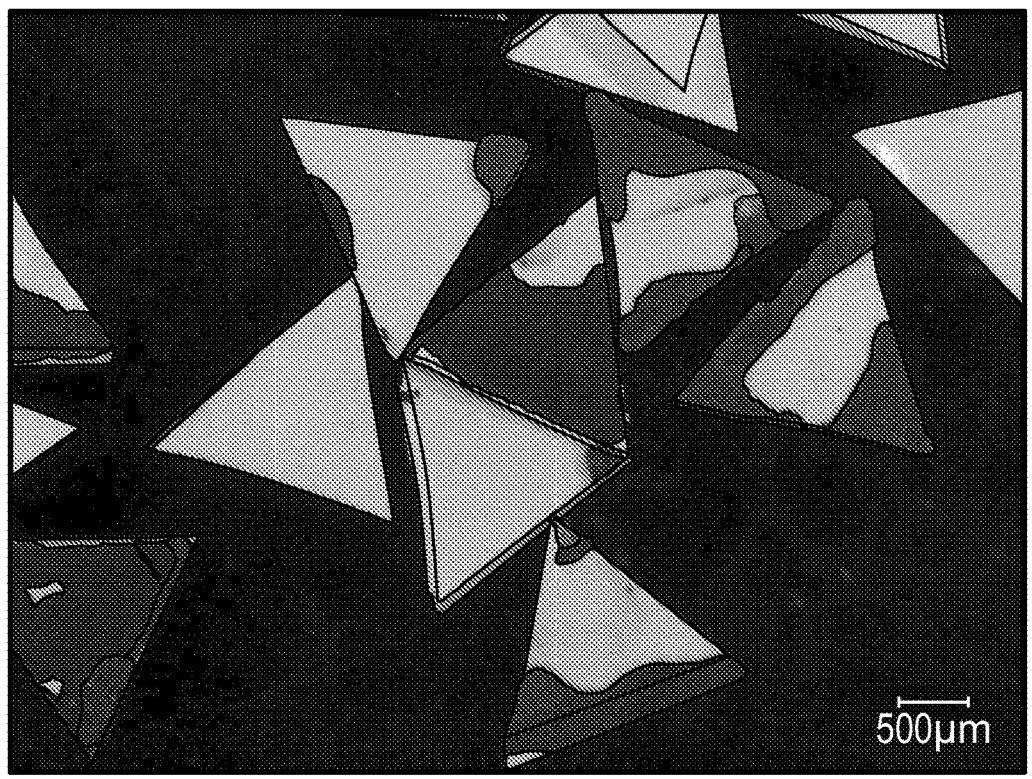
FIGS. 7 and 8 illustrate optical microscope images of magnetizable particles after firing according to Examples 3 and 4.

FIG. 7 illustrates the magnetizable particles made according to Example 3. FIG. 7 is an optical microscope image (50× magnification) of the particles after firing. The black portions are ferrite and the white portions are alumina.

Example 4 (EX-4)

A ferrite slurry of BP860 (250 g), Methocel (6.25 g), and water (400 g) was made by stirring with a Cowles blade at 3500 RPM for 20 minutes. Then about 10 g of the BP860 ferrite solution was coated onto an EAA film with an RDS No. 32 Mayer rod. The SAP1 particles were aligned in the same production tooling used during the initial step of molding, with triangular shaped mold cavities of 28 mils (711.2 microns) depth and 110 mils (2794 microns) to give essentially a monolayer of particles lying on one major face. These were transferred to the wet, slurry coated film. The tooling was removed and the film with the ferrite coating and SAP1 particles was dried at ambient temperature for 2 days. The SAP particles were removed from the film with a plastic squeegee. The coated particles were fed into a rotary firing/sintering kiln. The firing/sintering kiln consisted of an 8.9 cm inner diameter, 1.32 m long silicon carbide tube inclined at 4.4° with respect to the horizontal and had a 31 cm hot zone. The heat was applied externally via SiC electric heating elements. The sintering kiln rotated at 6.0 rpm, to provide a residence time in the tube of about 5 minutes. The firing/sintering temperature was about 1430° C. The product exited the kiln into room temperature air where it was collected in a metal container and allowed to cool.

Figure 8:
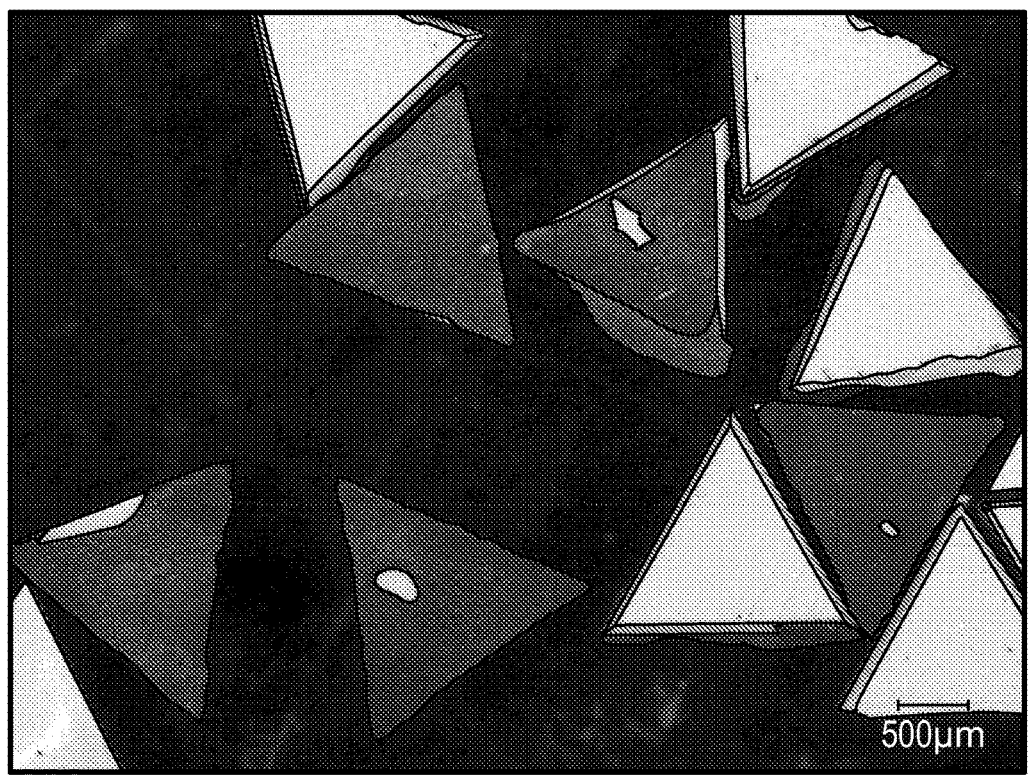

FIG. 8 illustrates the magnetizable particles made according to Example 4. FIG. 8 is an optical microscope image (50× magnification) of the particles after firing.

Example 5 (EX-5)

A ferrite slurry of BP860 (250 g), Methocel (6.25 g), and water (400 g) was made by stirring with a Cowles blade at 3500 RPM for 20 minutes. Then about 10 g of the BP860 ferrite solution was coated onto an EAA film with an RDS No. 32 Mayer rod. The SAP2 particles were aligned in the same production tooling used during the initial step of molding, with triangular shaped mold cavities of 28 mils (711.2 microns) depth and 110 mils (2794 microns) to give essentially a monolayer of particles lying on one major face. These were transferred to the wet, slurry coated film. The tooling was removed and the film with the ferrite coating and SAP2 particles was dried at ambient temperature for 2 days. The SAP2 particles were removed from the film with a plastic squeegee. The coated particles were fed into a rotary firing/sintering kiln. The firing/sintering kiln consisted of an 8.9 cm inner diameter, 1.32 m long silicon carbide tube inclined at 4.4° with respect to the horizontal and had a 31 cm hot zone. The heat was applied externally via SiC electric heating elements. The sintering kiln rotated at 6.0 rpm, to provide a residence time in the tube of about 5 minutes. The firing/sintering temperature was about 1430° C. The product exited the kiln into room temperature air where it was collected in a metal container and allowed to cool.

Example 6 (EX-6)

A precut vulcanized fiber disc blank with a diameter of 7 inches (17.8 cm), having a center hole of ⅞-inch (2.2 cm) diameter and a thickness of 0.83 mm (33 mils) was coated with 180 g/m² of a phenolic resin consisting of 49.2 parts of resole phenolic resin, 40.6 parts of calcium metasilicate, and 10.2 parts of water. A brush was used to apply the resin such that 4.5 g of resin was evenly spread out on the surface. This was placed on top of an 8 inch (20.3 cm) diameter by 2 inch (5.1 cm) thick permanent neodymium magnet with an average magnetic field of 0.6 Tesla. The ferrite coated SAP2 from EX-5 (10 g) was dropped from a height of about 10" using a handheld shaker onto the resin coated fiber disc. Then 10 g of crushed alumina was dropped from a height of about 10" using a handheld shaker onto the resin coated fiber disc. This composition was heat treated in an oven under the following conditions: 10° F./min ramp to 175° F., hold for 30 minutes, 10° F./min ramp to 195° F., hold for 30 minutes, 10° F./min ramp to 210° F., hold for 70 minutes. The discs were then removed from the oven and allowed to cool.

Figure 9:
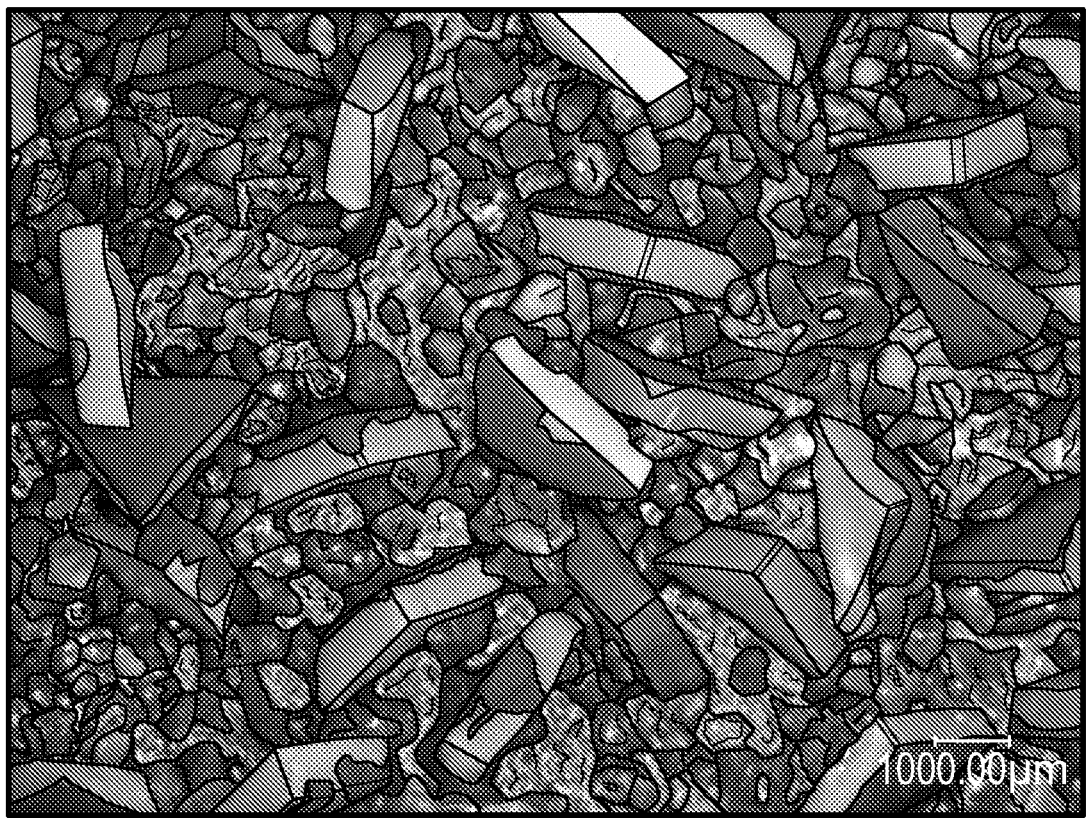
FIG. 9 illustrates the magnetic orientation of abrasive minerals on an abrasive article according to Example 6.
Figure 10:
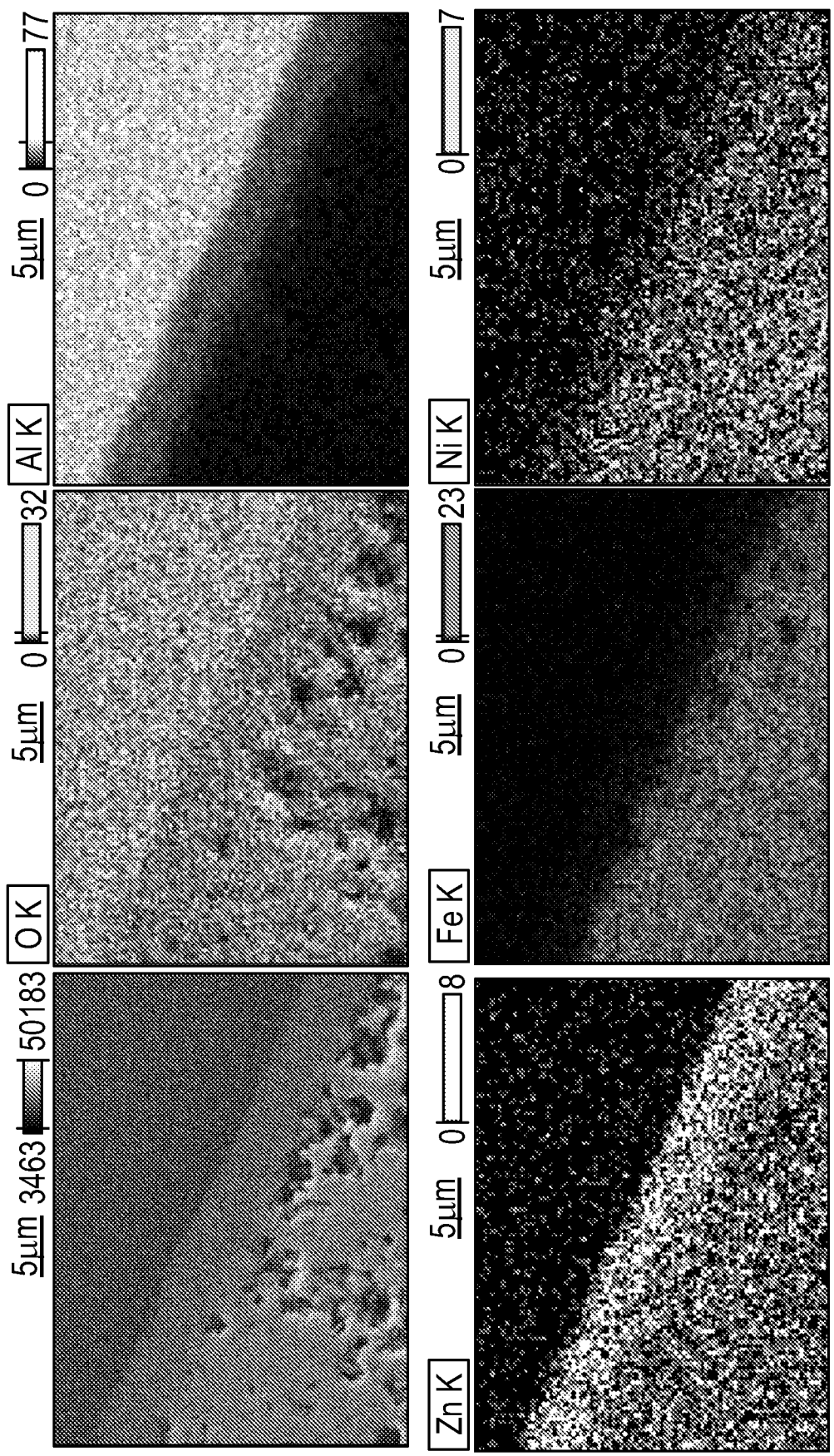
FIG. 10 illustrates an X-ray map using Energy Dispersive X-ray Microanalysis showing the presence of elements in a reaction layer according to an embodiment of the present invention.

FIG. 9 illustrates the abrasive article made according to Example 6. FIG. 9 is an optical microscope image (50× magnification) exhibiting the orientation of the particles in the article construction.

TABLE 3

Properties of the ferrite coated particles

| | Magnetic Properties | | |
|---|---|---|---|
| Example | $M_S$, emu/g | $H_C$, Oe | $M_R/M_S$, % |
| EX-1 (calcined) | 5.7 | 47 | 6.0 |
| EX-1 (sintered) | 0.30 | 18 | 7.8 |
| EX-2 (calcined) | 12 | 18 | 3.6 |
| EX-2 (sintered) | 13 | 3.7 | 2.0 |
| EX-3 | 1.4 | 15 | 8.2 |
| EX-4 | 4.7 | 14 | 7.3 |
| EX-5 | 8.6 | 6.3 | 3.3 |

Example 7 (EX-7)

A sample of boehmite sol-gel was made using the following procedure: Disperal (1280 parts) was dispersed by high shear mixing a solution containing water (1770 parts) and 70% aqueous nitric acid (52 parts) and a suspension of alpha alumina powder with surface area of 104 m²/g at 40% solids (51 parts). The suspension of alpha alumina powder was produced by milling of alumina powder using horizontal bead mill (obtained from Buhler Inc. under trade designation of Centex S2). The resulting boehmite sol was mixed for a total of 11 minutes. The resulting sol-gel was aged for at least 1 hour before coating. The sol-gel was forced into production tooling having triangular shaped mold cavities of 28 mils (711.2 microns) depth and 110 mils (2794 microns) on each side. The draft angle α between the sidewall and bottom of the mold was 98 degrees. The sol-gel was forced into the cavities with a putty knife so that the mold openings of the production tooling were filled. A mold release agent, 0.2% peanut oil in methanol was used to coat the production tooling using a brush to fill the open mold cavities in the production tooling. The methanol evaporated in a fume hood at room temperature. The sol-gel coated production tooling was air-dried at room temperature for at least 10 minutes, giving a concentration of release agent (after evaporation of the methanol) of 0.08 mg/in², and an average thickness of the coating (prior to evaporation of the methanol) of 138 microns. The precursor shaped abrasive particles were removed from the production tooling by passing it over an ultrasonic horn.

A ferrite slurry of BP860 (250 g), Methocel (6.25 g), and water (400 g) was made by stirring with a Cowles blade at 3500 RPM for 20 minutes. Then about 10 g of the BP860 ferrite solution was coated onto an EAA film with an RDS No. 32 Mayer rod. Both samples (dry gel and prefired particles) were drop coated onto the film and allowed to dry overnight. The particles were then released with a plastic squeegee and continued to be prefired, and final fired.

Figure 11A:
FIGS. 11-13 illustrate magnetizable particles described in the Examples.
Figure 11B:
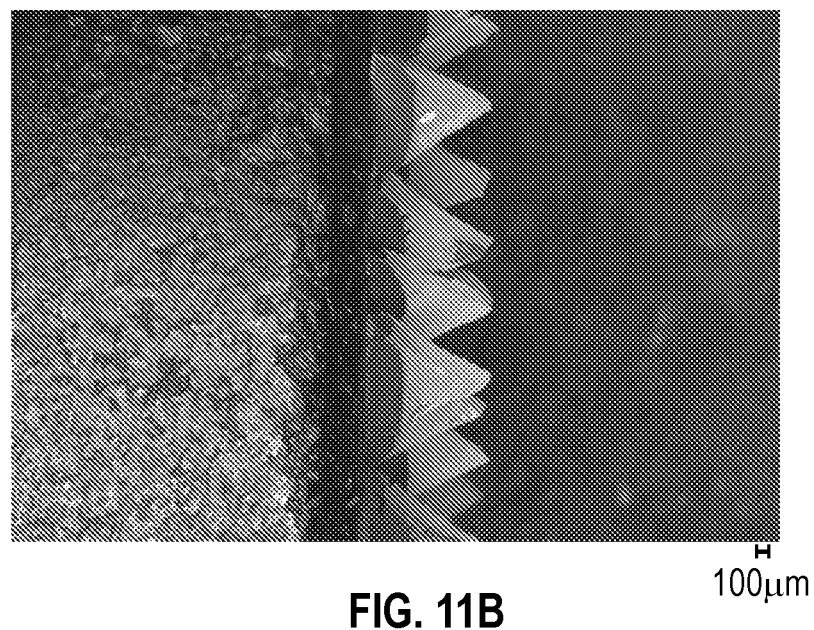

The integrity of the ferrite film was evaluated by optical microscopy. More importantly, due to the specific formulation of the ferrite slurry, the particles were magnetically responsive after final firing, and they preferentially oriented with a tip perpendicular to the base plane of a magnet (FIGS. 11A, 11B). It was also noted that the particles were not coated uniformly, but only partially on one side. Regardless of the lack of uniformity of the ferrite film, the particles were magnetically oriented upward.

The insights gained in the previous section demonstrated that the ferrite coatings can be applied directly to dry gel, that magnetic response is still observed after final firing, and that non uniform coatings on one side of PSG is still sufficient to provide upward orientation.

Example 8 (EX-8)

Figure 12:
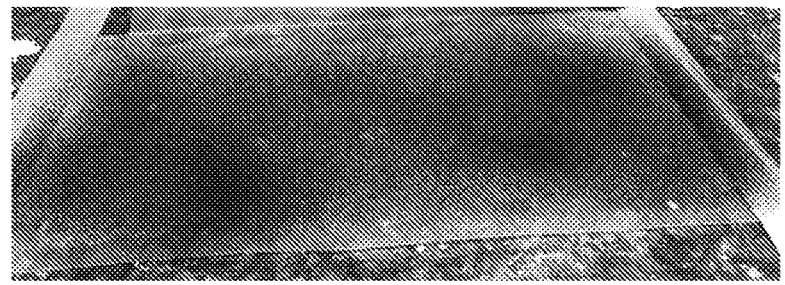

As depicted in FIG. 12, a preval sprayer was used to distribute the ferrite coating on one side of dry gel particles.

Figure 13:
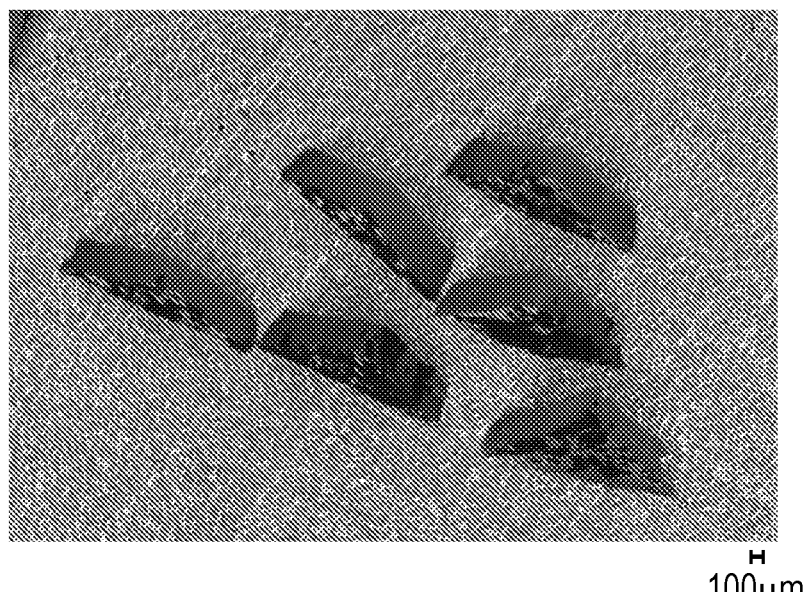

Ferrite coating was allowed to dry overnight at ambient temperature. Particles were released and slow fired with the following temperature profile:
Ramp1: 35-1000 C @ 3 C/min
Ramp2:1000-1300 @1.5 C/min
Hold: 1300 C 20 min
Ramp 3: 1300-1000 @1.5 C/min
Ramp 4: 1000-350 @ 3 C/min After firing, particles were inspected with optical microscope, spots of ferrite slurry were non-uniformly coated on one side of the PSG particle. Initial magnetic response was observed when the particles were placed on top of a magnet, where they preferentially oriented perpendicularly to the base plane of the magnet. Moreover, a video of the particles free falling on top of the magnet shows them standing up FIG. 13 illustrates alumina seeded abrasive grain with ferrite coating (sprayed). Tip upward orientation on top of magnet.

What is claimed is:
1. A method of making magnetizable abrasive particles, comprising:

forming a ceramic particle precursor from a sol-gel precursor material, the sol-gel precursor material comprising alpha-alumina, wherein forming comprises drying the sol-gel precursor material in a shaped mold cavity;

applying a coating directly to a surface of the ceramic particle precursor, wherein the, coating comprises a magnetically responsive material; and firing the coated ceramic particle precursor to create a sintered ceramic particle and wherein, after firing, the magnetically responsive material is responsive to a magnetic field.

2. The method of claim 1, and further comprising:
removing solvent from the ceramic particle precursor.

3. The method of claim 2, wherein removing solvent comprises a pre-firing process.

4. The method of claim 1, wherein firing the magnetic coated ceramic particle causes a reaction layer to form between the applied coating layer and a ceramic particle layer.

5. The method of claim 4, wherein the reaction layer comprises alumina, zinc, iron or nickel.

6. The method of claim 1, wherein the magnetically responsive coating comprises ferrite.

7. The method of claim 1, wherein the magnetic coating is a unitary coating.

8. The method of claim 1, wherein the magnetically responsive coating is substantially limited to a single side of the ceramic particle precursor.

9. The method of claim 1, wherein the magnetically responsive coating comprises a soft magnetic material.

10. The method of claim 1, wherein coating comprises applying a slurry of the magnetically responsive material.

11. The method of claim 10, wherein the ferrite magnetically responsive material comprises a nickel zinc ferrite material.

12. The method of claim 1, wherein the ceramic particle precursor is formed within a tool having a mold cavity, such that the ceramic particle precursor has a shape that is a negative image of the mold cavity.

13. The method of claim 1, wherein the ceramic particle precursor is a fully dense ceramic particle.

14. The method of claim 13, wherein coating comprises applying the magnetic coating as a slurry while the ceramic particle precursor is in the mold cavity.

15. The method of claim 1, wherein firing comprises sintering the ceramic particle precursors at a temperature above 1250° C.

16. The method of claim 1, wherein the magnetically responsive material cannot be converted into a non-magnetic state during firing; wherein firing comprises heating the coated ceramic particle precursor in an oven to temperatures above 1250° C.

17. The method of claim 16, wherein the magnetically responsive material has a formula of: $XO \cdot M_m Fe_{2-m} O_3 (m<1)$ where X is a divalent cation and M is a trivalent cation, or a formula of $X_3 A_5 O_{12}$, where X and A are metals.

* * * * *

UNITED STATES PATENT AND TRADEMARK OFFICE
CERTIFICATE OF CORRECTION

PATENT NO. : 11,926,782 B2
APPLICATION NO. : 17/754654
DATED : March 12, 2024
INVENTOR(S) : Sergei A. Manuilov Page 1 of 1

It is certified that error appears in the above-identified patent and that said Letters Patent is hereby corrected as shown below:

In the Claims

<u>Column 23</u>
Line 6, In Claim 1, after "wherein the", delete ",".

<u>Column 24</u>
Line 5, In Claim 11, after "wherein the", delete "ferrite".

Signed and Sealed this
First Day of October, 2024

Katherine Kelly Vidal
*Director of the United States Patent and Trademark Office*